(12) United States Patent
Jeong

(10) Patent No.: US 6,813,147 B2
(45) Date of Patent: Nov. 2, 2004

(54) PORTABLE DISK PLAYER

(75) Inventor: Hwoa-Su Jeong, Pynongpesk (KR)

(73) Assignee: LG Electronics Inc., Seoul (KR)

( * ) Notice: Subject to any disclaimer, the term of this patent is extended or adjusted under 35 U.S.C. 154(b) by 55 days.

(21) Appl. No.: 10/190,560

(22) Filed: Jul. 9, 2002

(65) Prior Publication Data

US 2003/0011973 A1 Jan. 16, 2003

(30) Foreign Application Priority Data

Jul. 10, 2001 (KR) .......................................... 2001-41285

(51) Int. Cl.[7] .............................................. G06F 1/16
(52) U.S. Cl. ..................... 361/681; 361/679; 360/99.01; 369/31.01
(58) Field of Search ................................ 361/679–681; 360/99.01–99.11; 369/31.01, 75.1–75.2, 76–79

(56) References Cited

U.S. PATENT DOCUMENTS

,000,006 A * 8/1836 Blanchard ................. 144/134.1
5,265,083 A * 11/1993 Ishii et al. .................. 369/75.2

* cited by examiner

*Primary Examiner*—Yean-Hsi Chang
(74) *Attorney, Agent, or Firm*—Birch, Stewart, Kolasch & Birch, LLP

(57) ABSTRACT

A disk player includes: a base unit, to which a display unit is rotatably connected, having an upper housing and a lower housing, a board installed between the upper housing and the lower housing, a display LCD installed on an upper surface of the board for displaying operational state through the upper housing, and a board connection unit installed on and connected to the board, and connected to one side of the display LCD, for transferring signal to the display LCD.

11 Claims, 19 Drawing Sheets

PORTABLE DISK PLAYER

BACKGROUND OF THE INVENTION

1. Field of the Invention

The present invention relates to a disk player, and more particularly, to a disk player that is capable of reading or writing data on a disk.

2. Description of the Background Art

As disks are developed to store more data and a technique is developed to compressively store a data, a relatively large mount of data can be stored in one disk.

Owing to such an advancement in a recording medium such as a DVD-ROM, a CD-ROM, or the like, the DVD-ROM disk now can store a data as much as one piece of movie.

In line with the tendency, a disk player has been introduced to allow users to view a movie or performance scenes while carrying a DVD holding the movie or the performance scenes.

The disk player includes a base unit for receiving and driving a disk, reading a signal recorded in the disk and reproducing the read signal; and a display unit hinged rotatably at the base unit and displaying an image for users' view.

The display unit is connected to the base unit by a hinge assembly and set at an angle desired by the user.

The display unit is attached to the base unit when not being used, so that the entire disk player can be portable in a flat and rectangular form such as a book or a notebook and portable.

Thus, in order to heighten the portability, designing is requisite to minimize the thickness of the display unit and the base unit.

As for the disk player constructed with the base unit and the display unit, due to a tolerance of the hinge assembly caused during a fabrication process or bending of an injected object constituting the display unit, it frequently occurs that the display unit fails to be accurately attached to the base unit. In such a case, the display unit would come off from the base unit, causing a problem of a bad appearance.

In an effort to solve the problem, the display unit is engaged to the base unit by using a connecting hook, but this construction has an inconvenience that a releasing process is required to release the connection.

In the disk player, a speaker for outputting a voice signal is provided at one side of the base unit or the display unit.

And a connection terminal may be also installed to output the voice signal through a headphone or transmit to output the voice signal to an amplifier of audio equipment.

At this time, the speaker is to be positioned at a rear stage of a speaker grill formed exposed outwardly of the display unit or the base unit. In this respect, however, in case of an overall thin structure, the speaker cannot be fixed with a screw. Then, the installation state of the speaker is unstable and an output state of a sound is bad.

A lot of printed circuit boards (PCB) are used for the disk player. When the PCBs are mounted by using screws in the disk player, bosses should be formed for engagement of the screws, which occupy much space only to serve as an obstacle for a thin design.

In addition, for reproducing and recording of a disk, a pick-up base should be provided to rotate the disk and reproduce a signal recorded in the rotated disk.

Operation of the pick-up base causes much vibration and noise, so that it is preferably designed not to transmit the vibration and noise outwardly of the pick-up base.

For this purpose, in the conventional art, the pick-up base is fixed inside the base unit by using the screw with a vibration damper inserted. However, in this construction that the screw is used to fix the pick-up base, a thin design is difficult to obtain because the base unit occupies much space in the height direction.

Meanwhile, a display LCD for displaying an operation state is used for the portable disk player. The display LCD is mounted at the board such that its connection terminal is inserted into a mounting hole formed at the board and soldered.

However, when the mounting hole is formed at the board, an area of the mounting hole is so large for the board, resulting in that a space use efficiency of the board is degraded.

Especially, it works worst in case that a circuit pattern is formed at both surfaces of the board for a thin design and parts are mounted thereon, and a plurality of boards are installed overlapped with intervals.

A converting lever for manipulating a converting switch installed at a main board of the disk player is exposed outwardly through the side of the base unit. In order to install the converting lever at the side of the base unit, a construction is to be formed to guide the converting lever to a lower housing of the base unit and only after an upper housing is assembled, the converting lever is completely fixed.

A converting lever for manipulating a converting switch installed at a main board of the disk player is exposed outwardly through the side of the base unit. IN order to install the converting lever at the side of the base unit, a construction is to be formed to guide the converting lever to a lower housing of the base unit and only after an upper housing is assembled, the converting lever is completely fixed.

However, in such a case, it is difficult to disassemble and assemble the converting lever, and there is a limitation in forming the side of the base unit with various colors and designs.

Finally, in the conventional art, an LED holder is used to transmit a light of an LED installed on the board to the front side of the base unit and display an operation state of an instrument. The LED holder is engaged by using a screw or a portion inserted into the LED holder is melt by heat to be fixed. Thus, since the screw is additionally used, the number of parts is increased and the operation processes are accordingly increased in number. In addition, in case that the portion is melt by heat to fix the LED holder, its maintenance is impossible.

SUMMARY OF THE INVENTION

Therefore, an object of the present invention is to provide a thin disk player by reducing the thickness of a base unit and a display unit constituting a disk player.

To achieve these and other advantages and in accordance with the purpose of the present invention, as embodied and broadly described herein, there is provided a disk player including: display player includes: a base unit, to which a display unit is rotatably connected, having an upper housing and a lower housing, a board installed between the upper housing and the lower housing, a display LCD installed on an upper surface of the board for displaying operational state through the upper housing, and a board connection unit installed on and connected to the board, and connected to one side of the display LCD, for transferring signal to the display LCD.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
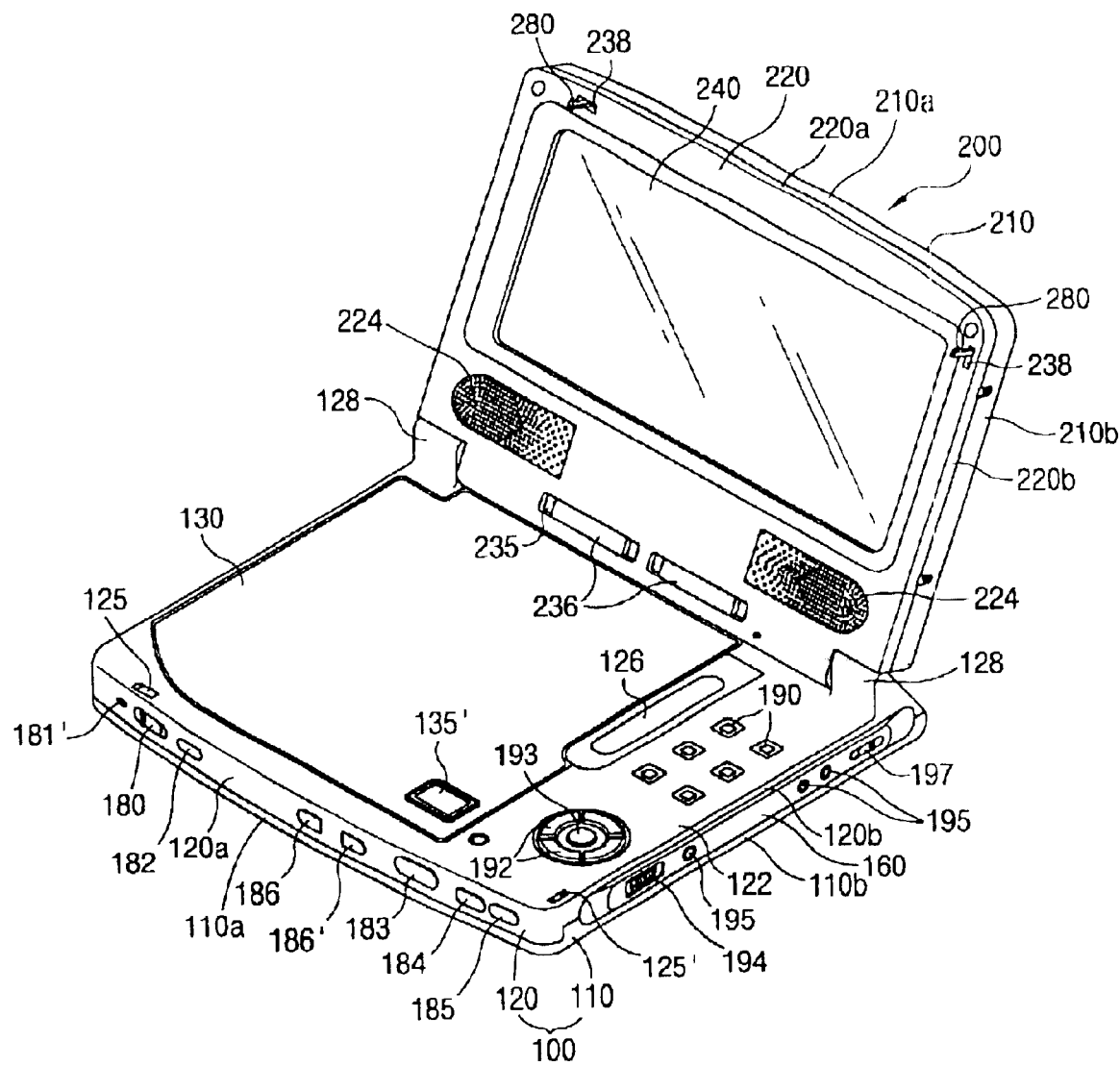
FIG. 1 is a perspective view showing a state that a display unit of a disk player is opened in accordance with the present invention.
Figure 2:
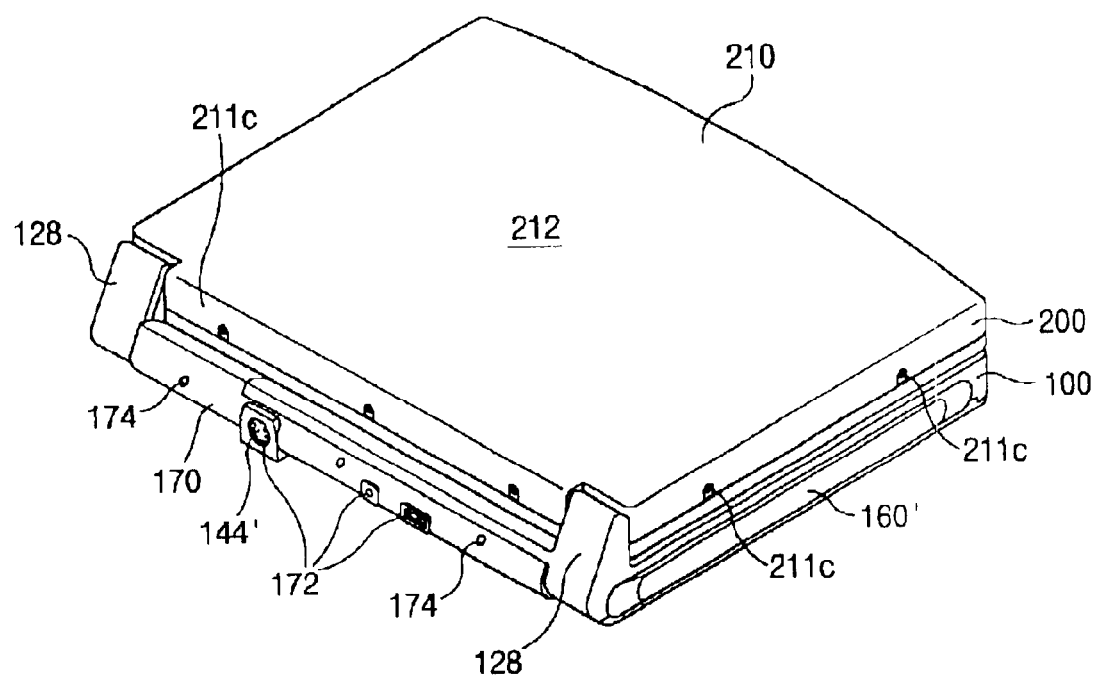
FIG. 2 is a rear perspective view showing a state that the display unit of the display player of FIG. 1 is closed.
Figure 3:
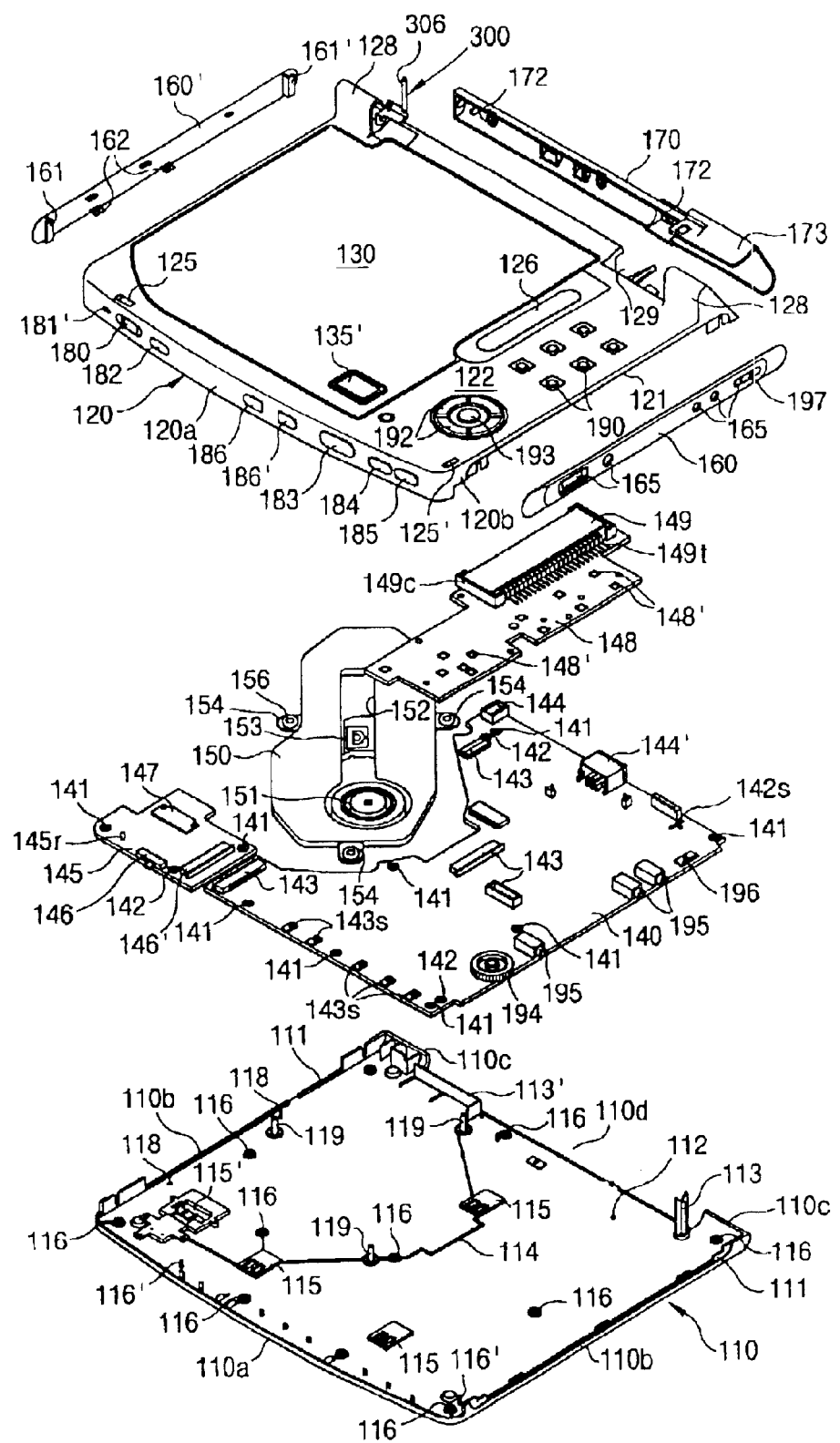
FIG. 3 is an exploded perspective view showing an internal construction of a base unit of the disk player of FIG. 1.

First, as shown in FIGS. 1 to 3, a disk player includes a base unit 100.

The base unit has a flat rectangular box shape and includes a lower housing 110 and an upper housing 120.

Various parts constituting the disk player are installed in the internal space formed by the lower housing 110 and the upper housing 120.

The lower housing 110 forms a bottom surface of the base unit 100, and boards (140, 145) (to be described) and a pick-up base 150, or the like, are installed on the upper surface 112.

A front wall 110a is formed along the front line of the lower housing 110. The front wall 110a is extendedly protruded from an end of the upper surface 112 of the lower housing 110, thereby forming a portion of the front side of the base unit 100.

Side walls 100b are formed at both sides of the lower housing 110. A panel mounting portion 111 for mounting first and second deco panels 160 and 160' is formed long leftward and rightward.

The side wall 110b is mostly a bit protruded from the upper surface 112, except for both ends thereof. The front end of the side wall 110b is connected to both ends of the front wall 110a.

A rear wall 110c is formed at both sides of the rear end of the lower housing 110 so as to be connected to both ends of the left and right side walls 110b.

A cut-out portion 110d is formed between the rear walls 110c. The upper surface 112 where the cut-out portion 110d is formed is concave toward the front wall 110a compared to the portions where the rear walls 110c are formed.

A hinge rib 113 is protrusively formed to support a hinge shaft 223 (to be described) adjacent to one rear wall 110c of the upper surface 112 of the lower housing 110. A support rib 113' is formed along the cut-out portion 110d adjacent to the rear wall 110c at the opposite side of the hinge rib 113. The support rib 113' supports a support plate 314 (to be described).

A reinforcing rib 114 is formed long from one side of the front end of the upper surface 112, to the central portion and to close to the support rib 113'. The reinforcing rib 114 is formed protruded with a certain height from the upper surface 112, so as to reinforce strength of the lower housing 110 with a certain area.

Figure 17:
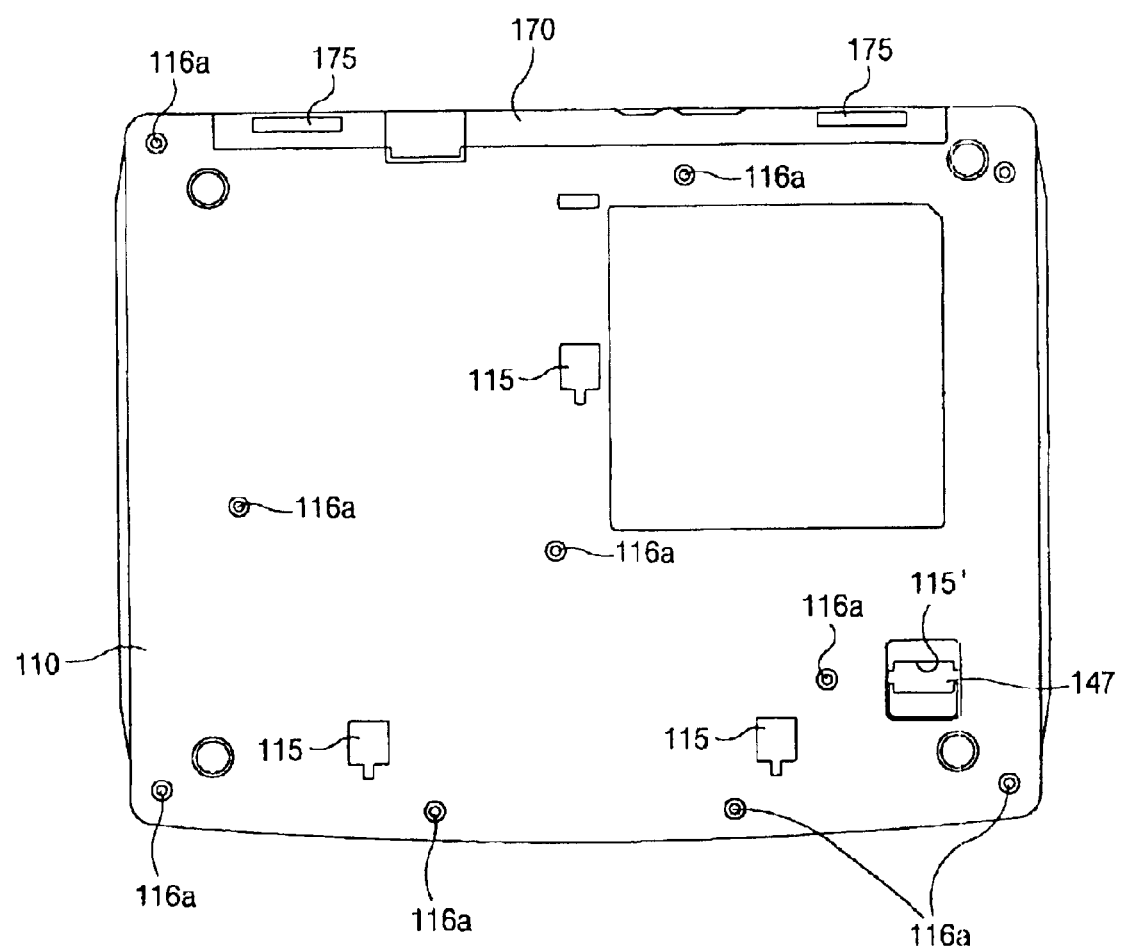
FIG. 17 is a plan view showing a bottom of the lower housing of the disk player of FIG. 1.

As shown in FIG. 17, a pack mounting unit 115 is formed at a lower surface of the lower housing 110, to mount a battery pack (not shown). The pack mounting unit 115 is formed protruded upwardly of the upper surface 112 and concave at the lower surface of the lower housing 110. The pack mounting unit 115 is formed as a through hole into which a hanging portion of the battery pack is inserted.

A terminal hole 115' for an electric connection with the battery pack is formed penetrating one side of the front end of the lower housing 110, and a power source terminal 147 is exposed through the lower housing 110.

A plurality of engaging ribs 116 are formed protruded to the upper surface 112 of the lower housing 110.

The engaging rib 116 includes a thread hole 116a penetrating up to the lower surface of the lower housing 110.

The boards 140 and 145 are mounted and engaged with the engaging rib 116.

A screw is inserted into the thread hole 116a from the lower surface of the lower housing 110 to engage the boards 140 and 145.

A guide pin 116' for guiding an installation position of the boards 140 and 145 is formed protruded at the upper surface 112 of the lower housing 110.

A plurality of support pins 118 are formed protruded adjacent to the panel mounting unit 111 of one side wall 110b at the upper surface 112 of the lower housing 110.

The support pins 118 support a second deco panel 160' (to be described).

A plurality of guide shafts 119 for installation of the pick-up base 150 is formed protruded at one side of the upper surface 112.

Figure 16A:
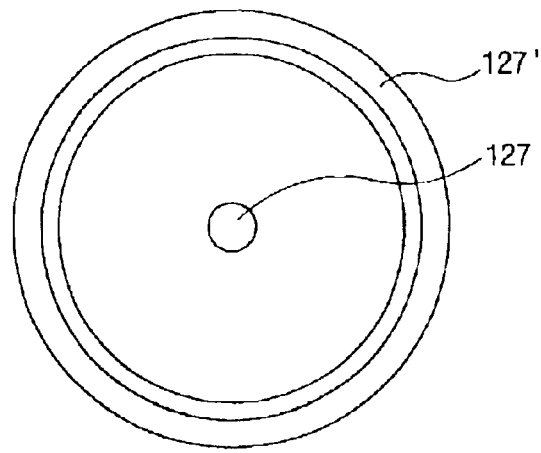
FIG. 16A is a sectional view showing a state that the vibration damper of the disk player of FIG. 1 is installed.

As shown in FIG. 16A, a combination hole 119' is formed at an upper center of the guide shaft 119. The combination hole 119' is a portion into which a combination pin 127 of the upper housing 120 is inserted.

A vibration damper support 119t is formed in a circular form at a lower end of the guide shaft 119. The vibration damper support 119t supports a lower portion of the vibration damper 156 (to be described).

Figure 16B:
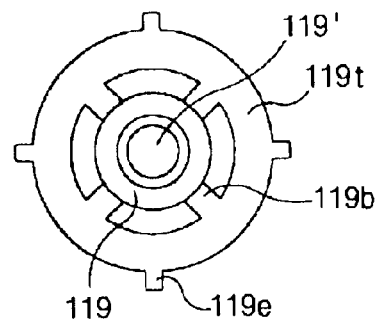
FIG. 16B is a rear view showing a mounting guide of an upper housing of the base unit of FIG. 1.
Figure 16C:
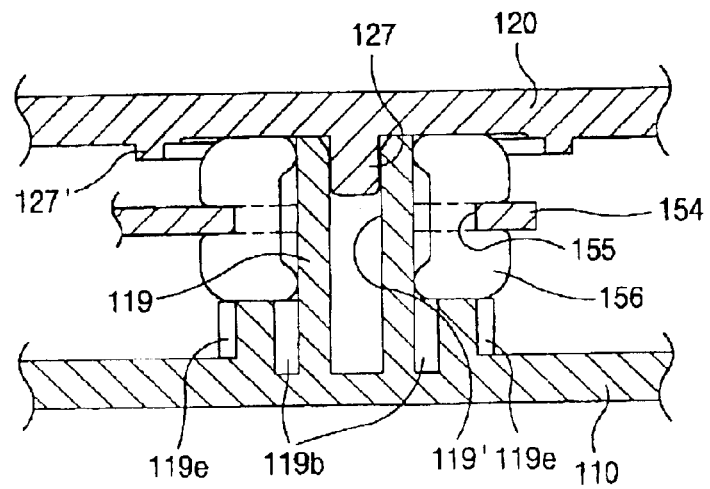
FIG. 16C is a plan view showing a vibration damper support of a lower housing of the base unit of the disk player of FIG. 1.

As shown in FIGS. 16A and 16C, the vibration damper support 119t makes a concentric circle with the guide shaft 119 with a certain space therebetween and formed protruded from the upper surface 112 of the lower housing 110.

A plurality of bridges 119b are formed to connect the vibration damper support 119t and the guide shaft 119, and a plurality of extended portions 119e are formed in a radial direction at the circumference of the vibration damper support 119t.

The guide shaft 119 combined with the combination pin 127 and the vibration damper support 119t have the same structure so that they can suitably support the vibration damper 156 and prevent eccentricity when the lower housing 110 is injection-molded.

A front wall 120a is formed at the front end of the upper housing 120 forming an upper portion of the base unit 100, so as to be corresponded to the front wall 110a of the lower housing 110. A button, a lever, or the like, for operation of the disk player and a display lamp for displaying an operation state are installed penetrating the front wall 120a.

A power lever 180 is installed at the left side of the front wall 120a. The power lever 180 performs a function of power-on, power-off or holding to maintain an ON/OFF state according to its position. A power display lamp 181' is installed at the left side of the power lever 180 to inform the user of the power-on state.

The structure for installation of the power display lamp 181' will now be described with reference to FIGS. 7 and 8.

Figure 7:
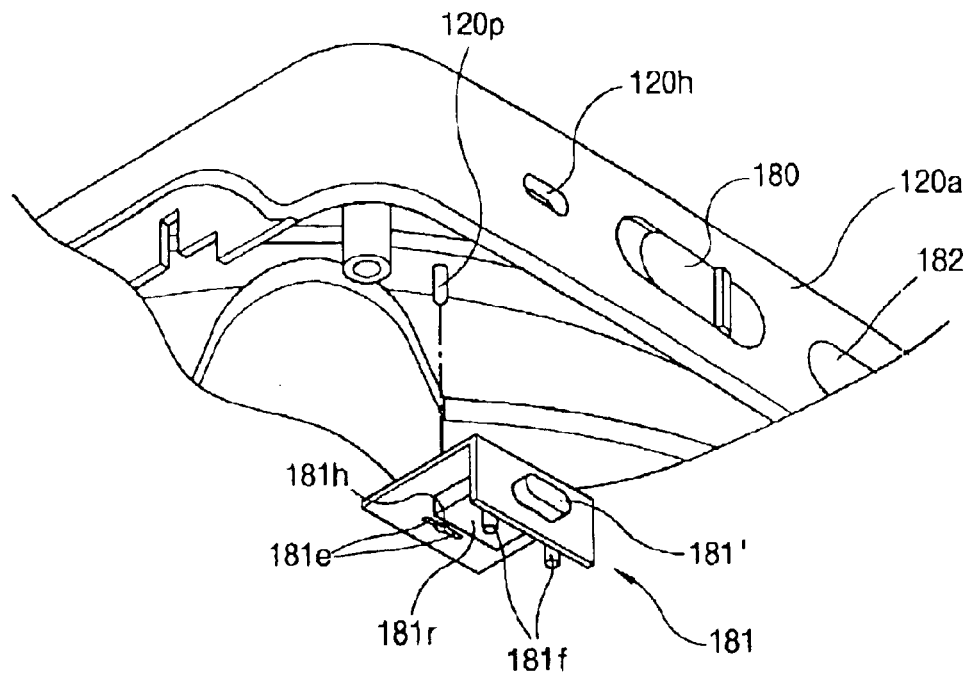
FIG. 7 is an exploded perspective view showing the construction that an LED holder of the disk player of FIG. 1 is installed.
Figure 8:
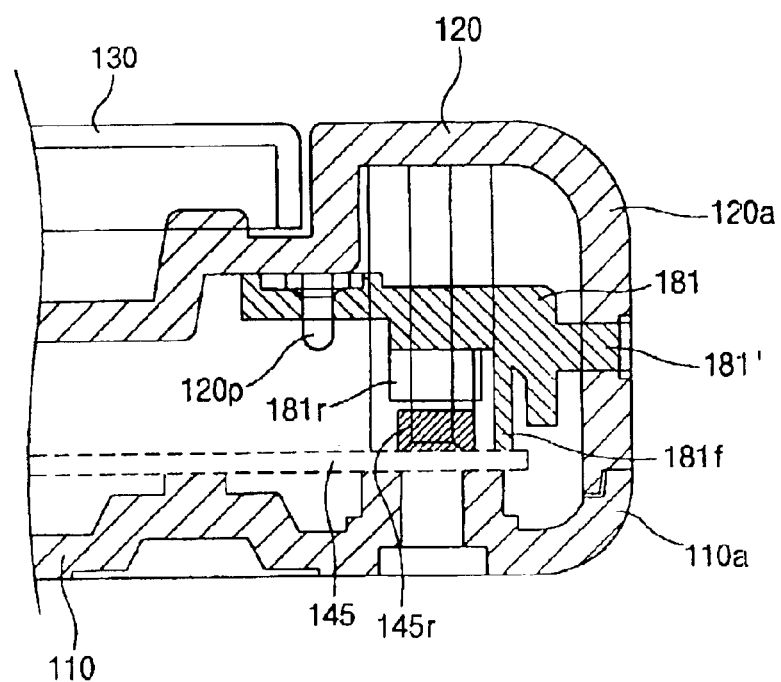
FIG. 8 is a sectional view showing the construction that the LED holder of the disk player of FIG. 1 is installed.

FIG. 7 is a view showing the upper housing 120 viewed from the bottom side.

As shown in FIG. 7, a through hole 120h is formed at one side of the front wall 120a of the upper housing 120. A fixing pin 120p is formed protruded at a lower surface of the upper housing 120 corresponding to an inner side where the though hole 120h is formed.

An LED holder 181 with the power display lamp 181' is fixed by the fixing pin 120p and the through hole 120h.

The LED holder 181 includes the power display lamp 181' inserted into the through hole 120h at its front end. The power display lamp 181' does not directly generate a light and emits a light provided from an LED 145r installed at the power supply board 145.

A light reflecting portion 181r is provided at the LED holder 181 in order to reflect the light of the LED 145r to be bent by 90° and transmit it to the power display lamp 181'.

A support leg 181f is provided at both ends of the light reflecting portion 181r. The support leg 181f is supported by the upper surface of the power supply board 145, and makes the light reflecting portion 181r at a distance from the LED 145r.

A fixing pin hole 181h is formed at one side of the LED holder 181. The fixing pin 120p formed at the lower surface of the upper housing 120 is inserted into the fixing pin hole 181h to fix the LED holder 181.

An elastic slot 181e is formed at both ends of the fixing pin hole 181h. A diameter of the fixing pin hole 181h is a little smaller than that of fixing pin 120p, and the fixing pin 120p is forcedly inserted in the fixing pin hole 181h.

The elastic slot 181e for facilitating the assembling of the LED holder 181, enables the fixing pin 120p to be easily inserted into the fixing pin hole 181h by making the diameter of the fixing pin hole 181h, when the fixing pin 120p is inserted into the fixing pin hole 181h. And after assembling of the LED holder 181, the elastic slot 181e firmly maintains the assembling of the fixing pin 181h and the fixing pin 120p.

A remote controller light receiving portion 182 is provided at the right side of the power lever 180. The remote controller light receiving portion 182 receives a signal injected from a remote controller (not shown) and operates the disk player.

A reproduction button 183 is installed at the right side of the front wall 120a to drive the disk. A temporary stop button 184, a stop button 185 are installed in turn at the right side of the reproduction button 183. A forward searching button 168 and a backward searching button 186' are installed at the left side of the reproduction button 183.

A side wall 120b is formed at both ends of the front wall 120a. A panel mounting unit 121 is formed at the side wall 120b in order to mount the deco panels 160 and 160'.

The panel mounting unit 121 forms a space together with the panel mounting unit 111 of the lower housing 110, on which the deco panels 160 and 160' are mounted.

An upper opening 123 is formed at one side of the upper surface 122 of the upper housing 120. The upper opening 123 is opened and closed by a dick cover 130 (to be described).

Figure 5:
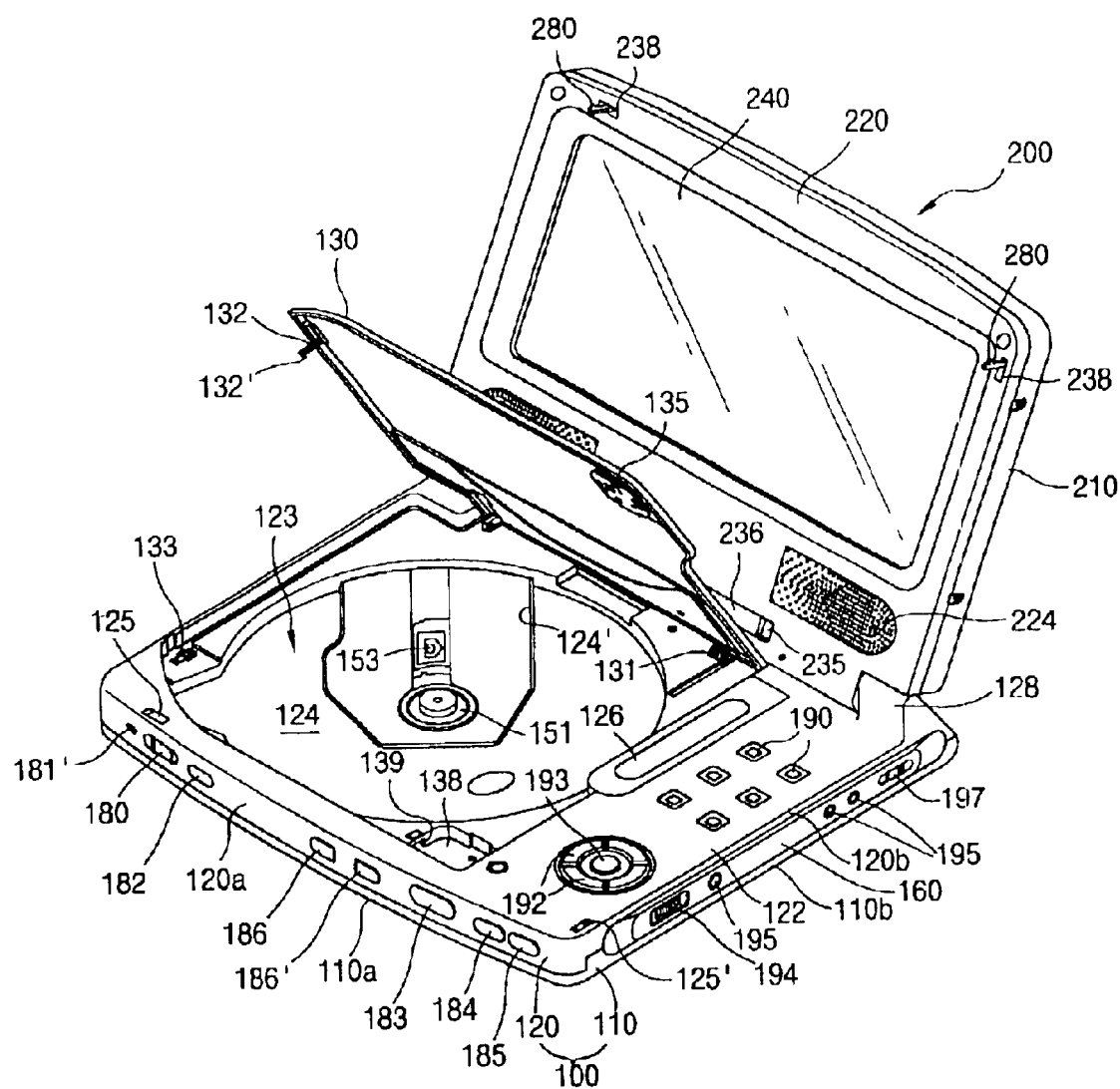
FIG. 5 is a perspective view showing a state that a disk cover of the disk player of FIG. 1 is completely opened.

As shown in FIG. 5, a disk mounting surface 124 is formed inside the upper opening 123, and a pick-up window 124' is formed long in one direction from the center of the disk mounting surface 124.

Hooking grooves 125 and 125' are formed at both sides of the front end of the upper surface 122 of the upper housing 120 in order to maintain a locking state of the display unit 200.

An operation display window 126 is formed at the right side of the upper surface 122 along one side of the upper opening 123.

A plurality of mode buttons 190 are installed at one side of the operation display window 126, that are required to reproduce the disk by the disk player. The mode buttons 190 select various modes required to reproduce the disk. For example, in case of DVD, a user uses interactively these buttons 190 for selecting various modes, such as play mode, scan mode, etc.

A plurality of shift buttons 192 are installed in a circular form at the lower side of the mode buttons 190, and a select button 193 is installed at the center of the shift buttons 192. For instance, the shift button is to come into a specific mode by means of the mode button 190 and shift from the mode to a desired sub-mode, and the select button 193 serves to select a desired mode.

With reference to FIGS. 16A and 16B, the combination pin 127 is formed at positions corresponding to the guide shaft 119 at the lower surface corresponding to the lower portion of the upper opening 123 of the upper housing 120.

The combination pin 127 is inserted into the combination hole 119' of the guide shaft 119. That is, as the combination pin 127 and the guide shaft 119 are mutually inserted, the upper housing 120 and the lower housing can be combined without any additional coupling member.

The guide shaft 119 and the combination pin 127 may be exchanged to be positioned at the upper housing 120 and the lower housing 110.

With reference to FIG. 16A, in order to surrounding the portion in which vibration damper 156 contacts the upper housing 120, a mounting guide 127' for guiding mounting of an outer circumferential portion of the vibration damper 156 is protruded in a circular form at the circumference of the combination hole 119'.

A hinge protrusion portion 128 is formed at both sides of the rear end of the upper housing 120, as shown in FIGS. 2 and 3. The hinge protrusion portion 128 has a hollow space therein where the hinge assembly 300 (to be described) is positioned. An upper cut-out portion 129 is formed at one side of the hinge protrusion portion 128.

A flexible cable passes through the upper cut-out portion 129 in order to transmit a signal between the base unit 100 and the display unit 200.

As shown in FIG. 5, the upper opening 123 of the upper housing 120 is selectively opened and closed by the disk cover 130. The disk cover 130 is opened and closed as the front end ascends and descends centering around one side, that is, the rear end of the upper housing 120.

For this purpose, hinge pins at both sides of the disk cover 130 are insertedly installed in the upper housing 120. The disk cover 130 is supported by an open spring 131 in a direction that it is constantly opened.

With reference to FIG. 5, a hooker 132 is installed at one side of a lower surface of the front end of the disk cover 130. The hooker 132 includes a hooking jaw 132' formed at its front end. A corresponding construction to the hooker 132 is formed at an inner side of the upper opening 123. That is, a ring through hole 133 is formed at a position corresponding to the hooker 132.

Figure 9:
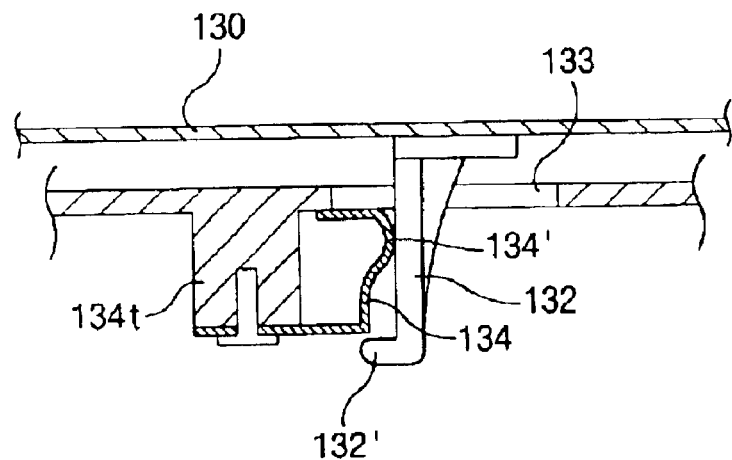
FIG. 9 is a sectional view showing a relation between a hooker and a hooking spring in a state that the disk cover of the disk player of FIG. 1 is locked.

As shown in FIG. 9, a hooking spring 134 to which the hooking jaw 132' of the hooker 132 is hooked is engaged and mounted at a mounting rib 134t by a screw, at the lower surface of the upper housing 120 corresponding to the inside of the ring through hole 133. The hooking spring 134 is a fort of a plate spring.

Figure 10:
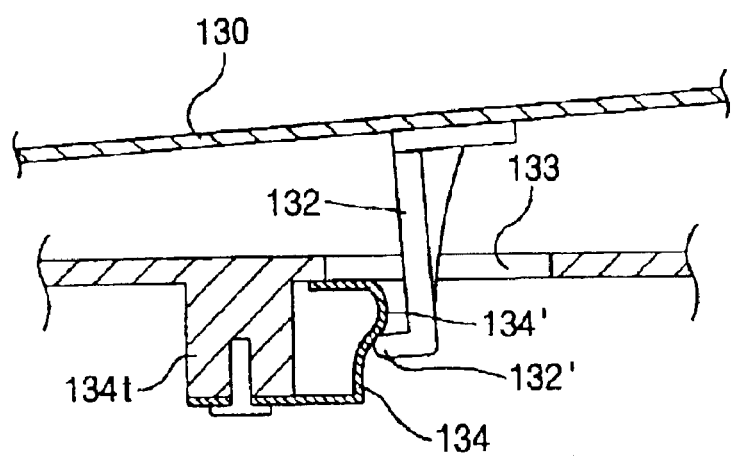
FIG. 10 is a sectional view showing a state that the hooker is hooked in the hooking spring in a state that the disk cover of the disk player of FIG. 1 is unlocked.

A round protruded face 134' is formed curved at one side of the hooking spring 134. As shown in FIGS. 9 and 10, when a locking unit 135 (to be described) is released from engagement, the front end of the disk cover 130 is lifted and opened by an elastic force of the open spring 131, and the hooking jaw 132' of the hooker 132 is hooked so that the disk cover 130 can not be rapidly opened.

When the user applies a force in a direction that the disk cover is opened, the round protrusion face 134' of the hooking spring 134 is depressed by the hooking jaw 132' and elastically transformed, so that the hooker 132 can be released from the ring through hole 133.

Figure 6:
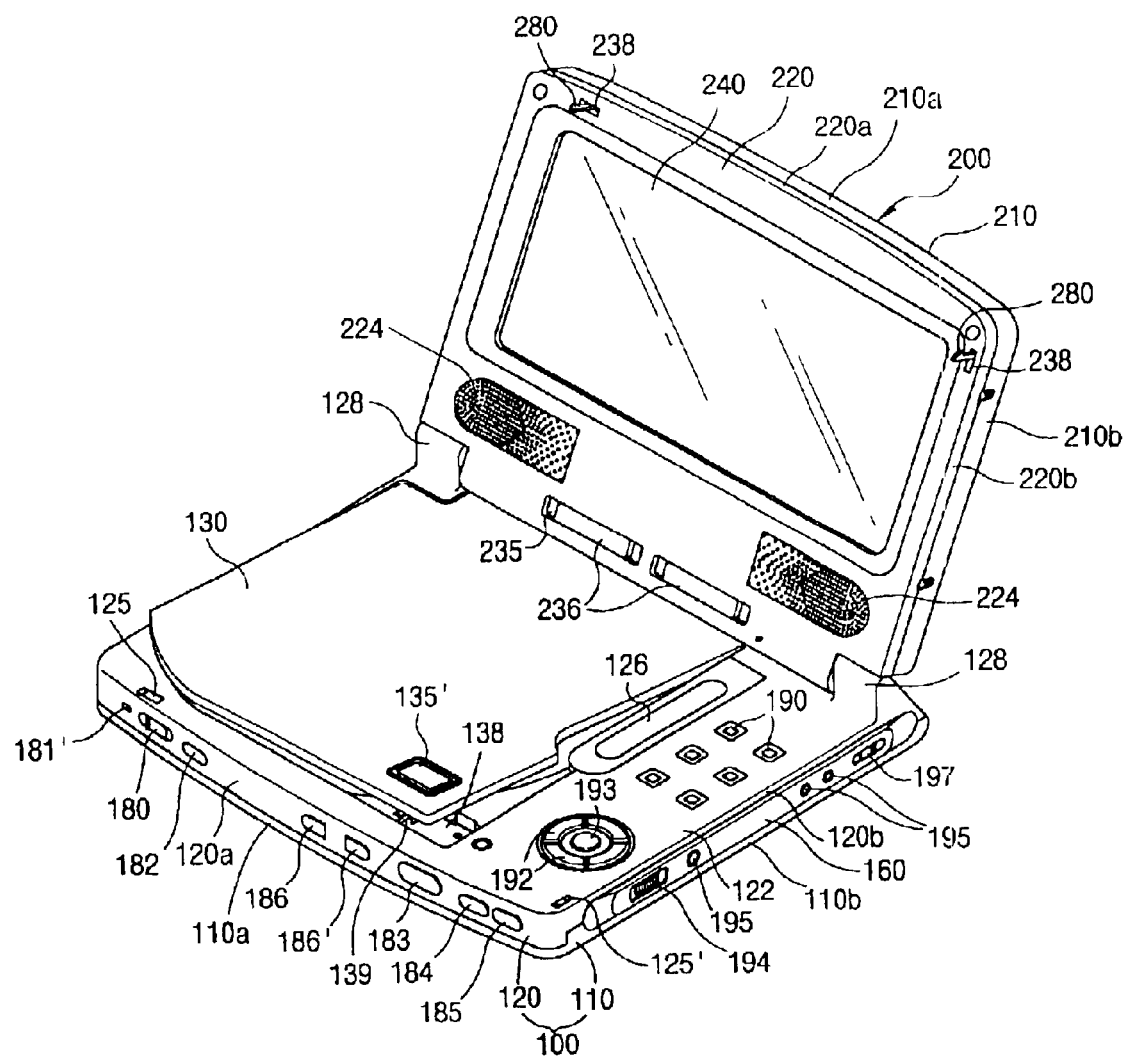
FIG. 6 is a perspective view showing a state that the disk cover of the disk player of FIG. 1 is unlocked.

In a state that the hooker 132 is hooked at the round protrusion face 134' as shown in FIG. 10, the disk cover 130 is partially opened as shown in FIG. 6, as the engaging unit 132 is released from its engagement.

In order for the disk cover 130 to be maintained in the closed state, a locking unit 135 is installed at a lower surface of the front end of the disk cover 130.

Figure 11:
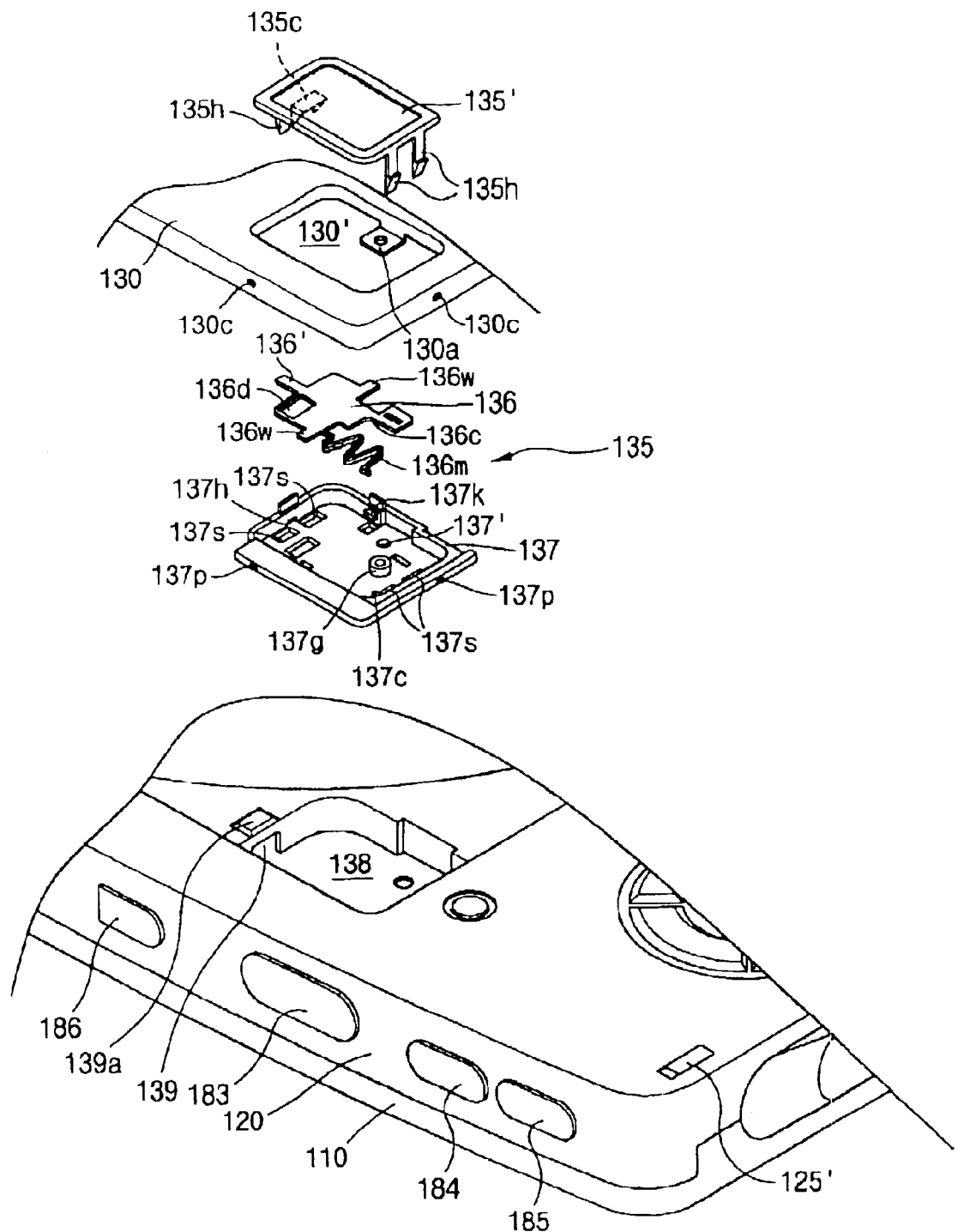
FIG. 11 is an exploded perspective view showing the construction of a locking unit of the disk player of FIG. 1.

As shown in FIG. 11, the locking unit is installed at the through hole 130' formed penetrating at one side of the disk cover 130.

An engaging piece 130a is formed protruded at one side of an inner wall of the through hole 130', so as to support the locking unit 135. In order to support the locking unit, a pin hooking hole 130c is formed at the side wall of the disk cover 130.

The locking unit 135 includes a release button 135', a locking hooker 136 and a housing 137. The release button 135' is exposed outwardly through the through hole 130' of the disk cover 130, and a plurality of combination hooks 135h are formed long and engaged with the housing 137 at the lower portion thereof.

A cam protrusion 135c is formed at the lower surface of the release button 135' in order to drive the locking hooker 136.

The locking hooker 136 has a locking piece 136' protruded at its front end and is inserted into a locking groove 139 (to be described) to maintain a locking state of the disk cover 130.

The locking piece 136' is formed inclined at its lower surface of the front end, and in this respect, the inclined face is formed so that the front end can be sharp.

A drive cam hole 136d is formed at the locking hooker 136 for interworking with the cam protrusion 135c of the release button 135'.

A hooking wing 136w is formed at both ends of the locking hooker 136 so that it may not be released from the housing 137.

A mold spring 136m is formed at the opposite side of the locking piece 136' to exert an elastic force in a direction that the locking piece 136' is inserted into the locking groove 139.

A shift cam face 136c is formed at one side of the rear end of the locking hooker 136.

The housing 137 includes an engaging hole 137' formed at one side thereof and engaged with the engaging piece 130a by a screw.

A hooking pin 137p inserted into the pin hooking hole 130c is formed at a position corresponding to the pin hooking hole 130c at the side of the housing 137.

A hook slot 137s into which the combination hook 135h penetrates is formed at a position corresponding to the combination hook 135h.

A guide protrusion 137g is formed inside the housing 137 to guide the shift cam face 136c in order to guide movement of the locking hooker 136, and a hooking portion 137c is formed by which an end portion of the mold spring is supported.

Incoming and outgoing hole 137 is formed at the opposite side of the hooking portion 137c, through which the locking piece 136' of the locking hooker 136 received into and withdrawn from the housing 137.

A release preventing piece 137k is formed at both ends inside the housing 137, at a position corresponding to the hooking wing 136w of the locking hooker, so as to guide movement of the locking hooker 136 and prevent the locking hooker 136 from releasing from the housing 137.

A mounting recess 138 is formed inside the upper opening 123 corresponding to the locking unit 135. The mounting recess 138 is formed corresponding to the outer appearance of the housing 137 so that the locking unit 135 can be mounted inside in a state that the disk cover 130 is closed.

A locking groove 139 is formed at one side of the mounting recess 138, so that the locking piece 136' of the locking hooker 136 is lengthened to maintain the locking state of the disk cover 130.

In this construction, the locking piece 136' is constantly protruded outwardly of the housing 137 through the incoming and outgoing hole 137h by the elasticity of the mold spring 136m.

Thus, when the disk cover 130 is depressed to cover the upper opening 123, the inclined face formed at the lower surface of the locking piece 136' meets the inclined portion 139a formed at one side of the mounting recess 138 and is guided along the portion where the locking groove 139 of the mounting recess 138 is formed, and as the locking hooker 136 is moved by overcoming the elastic force of the mold spring 136m, the locking piece 136' is moved into the housing 137.

Accordingly, the locking unit 135 is mounted inside the mounting recess 138, and as the locking piece 136 meets the locking groove 139, it is restored by the elastic force of the mold spring 136m, protruded outwardly of the incoming and outgoing hole 137h of the housing 137 and mounted in the locking groove 139. Then, the disk cover 130 is locked by the locking unit 135 to close the upper opening 123.

Parts installed at the internal space of the base unit 100 formed by the lower housing 110 and the upper housing 120 will now be described.

With reference to FIG. 3, a main board 140 is installed at the upper surface 112 of the lower housing 110.

The main board 140 is installed at an upper side of the reinforcing rib 114 of the lower housing 110 and an engaging hole 141 is formed at positions corresponding to the engaging rub 116.

A pin hole 142 is formed at a position corresponding to the guide pin 116'.

The main board 140 is engaged with the lower housing 110 by a screw as the guide pin 116' is inserted into the pin hole 142 and the engaging rib 116 supports the portion corresponding to the engaging hole 141. A hinge slot 142s is formed at one side of the main board 140, for penetration of the hinge rib 113.

Various circuits and devices for operations of the disk player are mounted on the main board 140.

For example, a plurality of connectors 143 for connection with various parts or other boards are provided on the main board 140, and a plurality of switches 143s for receiving an operation signal of a user from an external source are installed at positions corresponding to the front wall 120a of the upper housing 120.

A power input terminal 144 for receiving a power supply from an external source is installed at a rear end of the main board 140. A super video terminal 144' for outwardly transmitting an image signal is installed at a rear end of the main board 140.

Installation of the power input terminal 144 and the super-video terminal 144' at the rear end of the main board 140 is to expose the terminals through the rear surface of the base unit 100.

Various elements are installed exposed to the side of the base unit 100 through the first deco panel 160 on the main board 140.

That is, a volume dial 194 is installed at the side end portion of the main board 140. The volume dial 194 is to control the size of an outputted voice signal. A portion of the volume dial 194 is exposed to the side of the base unit 100 through one through hole 165 of the first deco panel 160, for a user's manipulation.

A plurality of output terminals 195 are installed at the side end portion of the main board 140.

The output terminal 195 is also exposed to the side of the base unit 100 through the through hole 165 of the first deco panel 160. An image signal or a voice signal is outputted through the output terminal 195.

A signal can be transmitted to a display apparatus including, for example, a head phone, an amplifier of an audio set and a TV, through the output terminal 195.

A converting switch 196 is installed on the main board 150. The converting switch 196 is manipulated by the converting lever 197 installed at the through hole 165 of the first deco panel 160.

Figure 12:
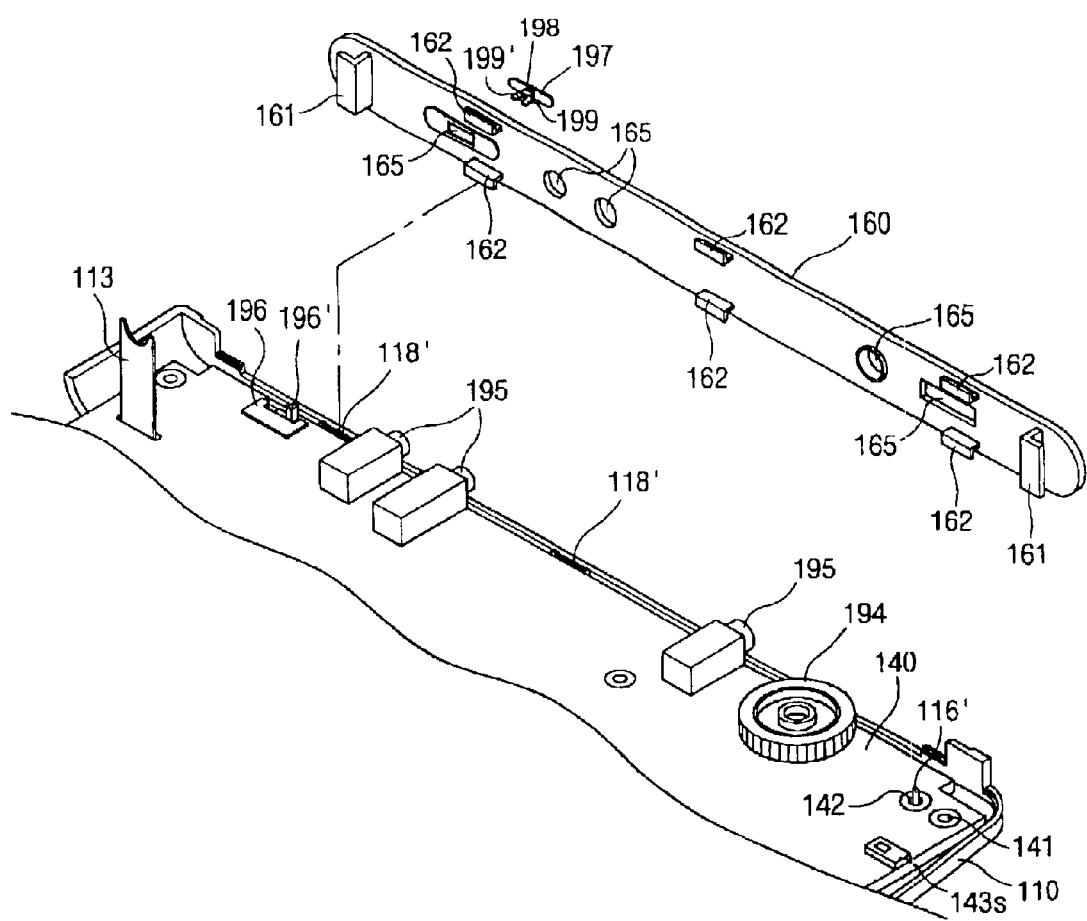
FIG. 12 is an exploded perspective view showing a converting lever and its peripheral construction of the disk player of FIG. 1.
Figure 13:
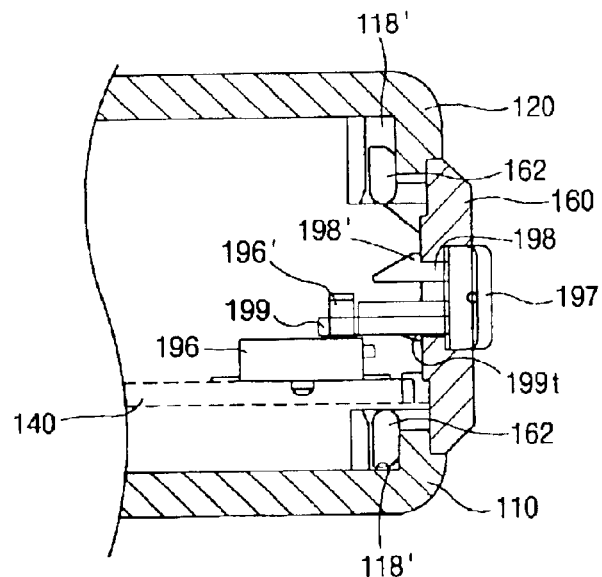
FIG. 13 is a sectional view showing the converting lever and its peripheral construction of the disk player of FIG. 1.

As shown in FIGS. 12 and 13, a shift guide 198 and a drive lever 199 are formed protruded at the rear surface of the converting lever 197. The shift guide 198 includes a hooking jaw 198' at its front end, and the hooking jaw 198 is guided by being hooked at the marginal portion of the through hole 165 at the rear side of the first deco panel 160. An upper surface of the front end of the shift guide 198 is formed inclined in such a manner that its thickness becomes thin as it goes to the front end.

The drive lever 199 drives the converting switch 196 and includes a lever receiving portion 199' formed at central portion of the front end, to receive the switch lever 196' of the converting switch 196. For a firm installation and smooth movement of the converting lever 197, a guide protrusion 199t is formed at the lower surface of the drive lever 199. The guide protrusion 199t allows the converting lever 197 to be mounted and moved at the through hole 165 together with the hooking jaw 198 of the shift guide 198.

The guide protrusion 199t is formed inclined downwardly toward the front end of the converting lever 197. At this time, the inclination direction of the guide protrusion 199t and the inclination direction of the front end of the shift guide 198 go in the facing direction, so that the converting lever 197 can be smoothly assembled to the deco panel 160.

The converting lever 197 manipulates the converting switch 196 so as to control outputting of a video signal and an audio signal from the disk player.

As shown in FIG. 13, the converting lever 197 is inserted into the through hole 165 of the first deco panel 160 and installed movable by the hooking jaw 198' and the guide protrusion 199t.

At this time, when the hooking jaw 198' and the guide protrusion 199t pass the through hole 165, the shift guide 198 and the drive lever 199 are elastically transformed in a direction that they become close. When the insertion is completed, they return to the original state. And the switch lever 196' of the converting switch 196 is inserted into the lever receiving portion 199' of the drive lever 199.

Thus, when the user moves the converting lever 197 in the through hole 165, the hooking jaw 198' and the guide protrusion 199t are guided to the upper and lower end marginal portions of the through hole 165. And the switch lever 196' inserted into the lever receiving portion 199' is driven according to the movement of the converting lever 197 and converted.

With reference to FIG. 3, the power board 145 is installed at a position corresponding to the terminal hole 115' of the lower housing 110. The power board 145 receives power from the battery pack and transmits it to the main board 150. The engaging hole 141 and the pin hole 142 are formed for its fixing.

A power switch 146 for ON/OFF of power and a connector 146t for connection with the main board 140 are provided at the power board 145. A power terminal 147 is installed at a position corresponding to the terminal hole 115', for an electric connection with the battery pack.

A button board 148 is installed to be connected with and supported by the connector 143 installed at the center of the main board 140. The button board 148 includes a switch 148' installed at positions corresponding to each of buttons 190, 192 and 193 installed at one side of the upper housing 120, in order to process a signal inputted through the buttons 190, 192 and 193.

A state display window 126 is positioned at one side of the button board 148 and a display LCD 149 is mounted to display an operational state of the disk player. Information related to the disk or various information related to the operations of the disk is displayed on the display LCD 149.

Figure 14:
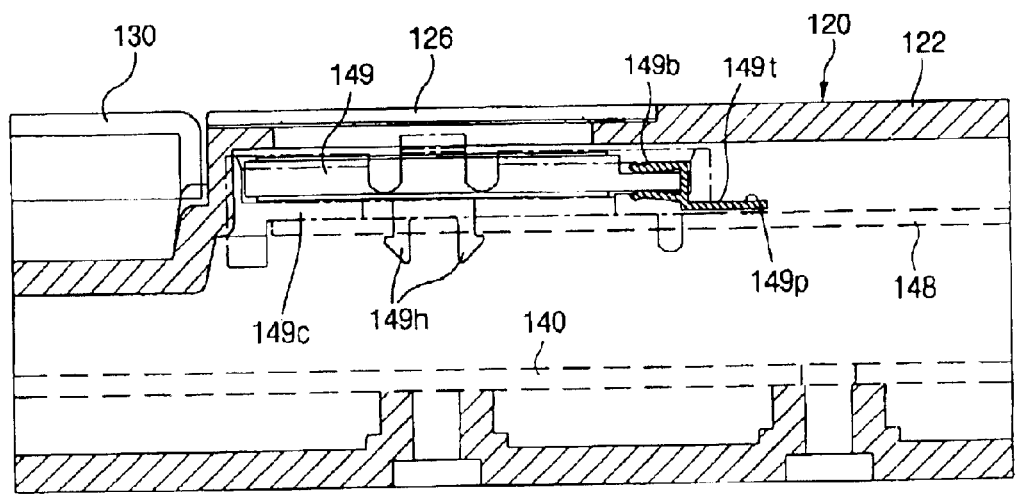
FIG. 14 is a sectional view showing a display LCD and its peripheral construction of the disk player of FIG. 1.

With reference to FIG. 14, the display LCD 149 is mounted inside an LCD case 149c, and the LCD case 149c has a plurality of engaging hooks 149h at its lower surface.

Thus, the display LCD 149 is mounted on the button board 148 by the engaging hooks 149h. A signal connection between the display LCD 149 and the button board 148 is made by the connection terminal 149t connected with one side of the display LCD 149.

The connection terminal 149t includes a board connection unit 149p formed in parallel to the upper surface of the button board 148, and a main body connection portion 149b is formed to be connected with the display LCD 148 integrally with the board connection unit 149p.

And the board connection unit 149p is connected to the button board 148 by connecting means such as soldering, after the LCD 149 is mounted on the LCD case 149c and the board connection unit 149p is connected to a connection portion of the display LCD 149.

The main body connection portion 149b may be formed branched, in other words, may have 'U' shape, into which one side of the display LCD 149 is inserted, as shown in FIG. 14.

With reference to FIG. 3, the pick-up base 150 is installed at the upper surface 112 of the lower housing 110. The pick-up base 150 is installed at the upper surface 112 corresponding to the left side of the reinforcing rib 114. A turntable 151 is installed at the pick-up base 150 in order to mount the disk to be exposed upwardly and rotate it.

A pick-up slot 152 is formed at the pick-up base 150, being extended long from one side of the turntable 151. A pick-up 153 is movably installed through the pick-up slot 152 in order to read a signal recorded on a signal record face of the disk. The pick-up 153 is moved along the pick-up slot 152 and reads a signal recorded on the disk. A spindle motor for rotating the turntable 151 and a sled motor for moving the pick-up 153 are installed at the lower surface of the pick-up base 150.

With reference to FIG. 3, a plurality of vibration damper receiving portions 154 are installed at the side portion or the inner side of the pick-up base 150 in a manner of being supported on the lower housing 110.

The vibration damper receiving portion 154 is provided at a position corresponding to the guide shaft 119 of the lower housing 110 and has a through hole 155 formed to penetrate it vertically.

Figure 15A:
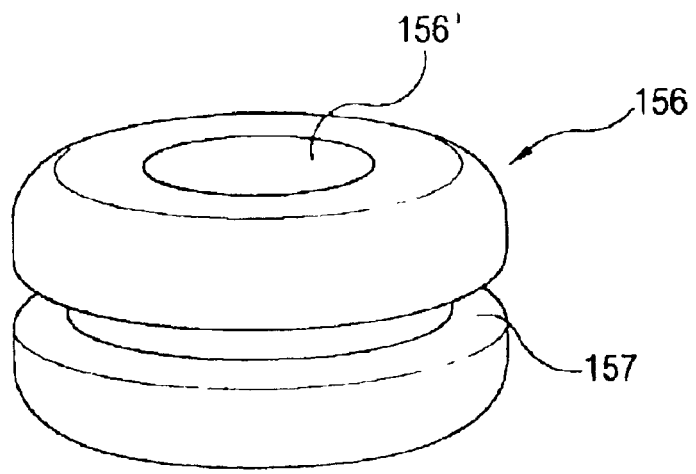
FIGS. 15A and 15B are perspective views showing a vibration damper of the disk player of FIG. 1.

A vibration damper 156 is installed at the through hole 155. With reference to FIG. 15A, the vibration damper 156 is made of a material with elasticity, and a central through hole 156' is formed penetrating the center thereof. The guide shaft 119 is penetratingly inserted into the central through hole 156'.

The vibration damper 156 includes a recess portion 157 at the middle portion surrounding the outer circumferential face. An outer diameter of the recess portion 157 is formed smaller than other portions of the vibration damper 156 and formed corresponding to an inner diameter of the through hole 155.

With reference to FIGS. 15A and 16A, referring to the vibration damper 156, in a state that the recess portion 157 is mounted in the through hole 155 of the vibration damper receiving portion 154, the guide shaft 119 is inserted into the central through hole 156' penetrating the center of the vibration damper and supported on the vibration damper support 119t so that the pick-up base 150 is supported on the lower housing 110.

At this time, the combination pin 127 of the upper housing 120 is inserted into the combination hole 119' of the guide shaft 119, and the upper portion of the vibration damper 156 is mounted inside the mounting guide 127' of the upper housing 120.

Figure 15B:
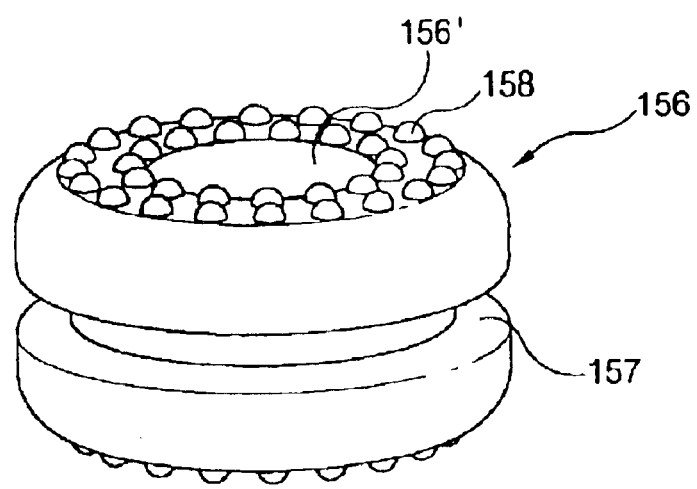

The vibration damper 156 serves to absorb vibration and noise transmitted between the lower housing 110 and the pick-up base 150, and especially, as shown in FIG. 15B, formation of contact protrusions 158 at the portion being in contact with the lower housing 110 and the upper housing 120 would help absorb much more vibration.

First and second deco panels 160 and 160' are installed at the panel mounting portions 111 and 121 formed at the side walls 110b and 120b of the lower housing 110 and the upper housing 120.

The first and second deco panels 160 and 160' forms both side faces of the base unit 100 and can have a different color to that of the lower housing 110 and the upper housing 120, for a fine appearance.

Insertion pieces 161 and 161' are formed inserted into the panel mounting portions 111 and 121 at both ends of the rear surface of the first and second deco panels 160 and 160'. A hooking piece 162 is formed perpendicular to the rear surface at the first and second deco panels 160 and 160'.

As shown in FIG. 12, the first hooking piece 162 formed in an 'L'-shape at the first deco panel 160, and a through hole is formed at the hooking piece 162 formed at the second deco panel 160'.

The insertion piece 161 is inserted into both ends of the side walls 110b and 120b of the lower housing 110 and the upper housing 120, and the first hooking piece 162 of the second deco panel 160' is inserted into the combination hole 118' formed inside the side walls 110b and 120b, thereby being fixed to the upper and lower housings 110 and 120.

The support pin 118 formed at the upper surface 112 of the lower housing 110 is inserted into the through hole which is formed at the hooking piece 162 formed at the second deco panel 160', and supports the second deco panel 160'.

A through hole 165 where the volume dial 194, the output terminal 195 and the converting lever 197 are installed is formed correspondingly at the first deco panel 160.

With reference to FIG. 3, a rear plate 170 is installed at the cut-out portion 110d forming the rear side of the base unit 100.

A plurality of through holes 172 are formed at the rear plate 170 in order to expose the terminals 144 and 144' installed at the main board 140.

A shield plate 173 is provided at one side of the rear plate 170. The shield plate 173 is positioned at the upper cut-out portion 129 and successively installed with the upper surface 122 of the upper housing 120.

With reference to FIG. 2, the rear plate 170 is engaged with the rear side of the upper housing 120 by a screw, for which the rear plate 170 includes a plurality of engaging holes 174.

A pack hooking groove 175 is formed at both ends of the lower surface of the rear plate 170, in order to fix the battery pack together with the pack mounting portion 115. The rear plate 170 forms the rear side of the base unit 100, as shown in FIG. 17.

The construction of the display unit 200 installed at the rear end of the base unit 100, and rotatable in a predetermined angle will now be described with reference to FIG. 4.

The display unit 200 is installed at the hinge protrusion portion 128 formed at the rear end of the base unit 100 so as to be rotatable by the hinge assembly 300 and the hinge shaft 223. The front surface of the display 200 is tightly closed to the upper surface 122 of the upper housing 120 constructing the upper surface of the base unit 100, or as shown in FIG. 1, is folded and opened with a certain angle against the upper surface 122.

The display unit 200 includes a cover 210 and a front frame 220.

A front wall 210a is formed bent at the front end of an upper surface 212 forming the surface of the cover 210. As shown in FIG. 1, the front wall 210a is bent at the front end of the upper surface 212 so as to form a portion of the front surface of the display unit 200.

A side wall 210b is formed at both sides of the front wall 210a. A connection portion between the front wall 210a and the side wall 210b is formed as a curved face with a certain curvature. The side wall 210b forms a portion of both faces of the display unit 200. A plurality of engaging holes 211 are formed at the side wall 210b for engagement with the front frame 220.

A rear wall 210c is formed at the rear end of the upper surface 212. The rear wall 210c is not connected with the side wall 210b. A plurality of engaging holes 211 are formed at the rear wall 210c for engagement with the front frame 220. The portion where the rear wall 210c is formed is positioned between the hinge protrusion portion 128, and an interference avoiding portion 214 is formed at both ends of the rear wall 210c to avoid interference with the hinge protrusion portion 128. A hinge through hole 216 is formed at the interference avoiding portion 214.

The front frame 220 forms an outer appearance of the display unit 200, together with the cover 210. A front wall 220a is formed at the front end of the front frame 220.

As shown in FIG. 1, the front wall 220a forms the front surface of the display unit 200 together with the front wall 210a of the cover 210. A side wall 220b is formed at both sides of the front frame 220 by being connected with the front wall 220a. The side wall 220b also forms the both sides of the display unit 200 together with the side wall 210b of the cover 210.

A rear wall 220c is formed at a rear end of the front frame 220. The rear wall 220c is formed with a length corresponding to the rear wall 210c of the cover 210, and a hinge shaft 223 inserted into the hinge protrusion portion 128 is formed at one side thereof and a hinge hole 223' that the hinge assembly 300 penetrates is formed at the other side thereof. The hinge shaft 223 is protruded to a portion corresponding to the interference avoiding portion 214, and the hinge hole 223' is opened toward the interference avoiding portion 214.

An LCD window 221 is formed at the front frame 220. The LCD window 221 occupies most area of the front frame 220 and is formed penetrating it forward-backwardly. A window fence 222 is formed surrounding the inside of the LCD window 220.

Figure 4:
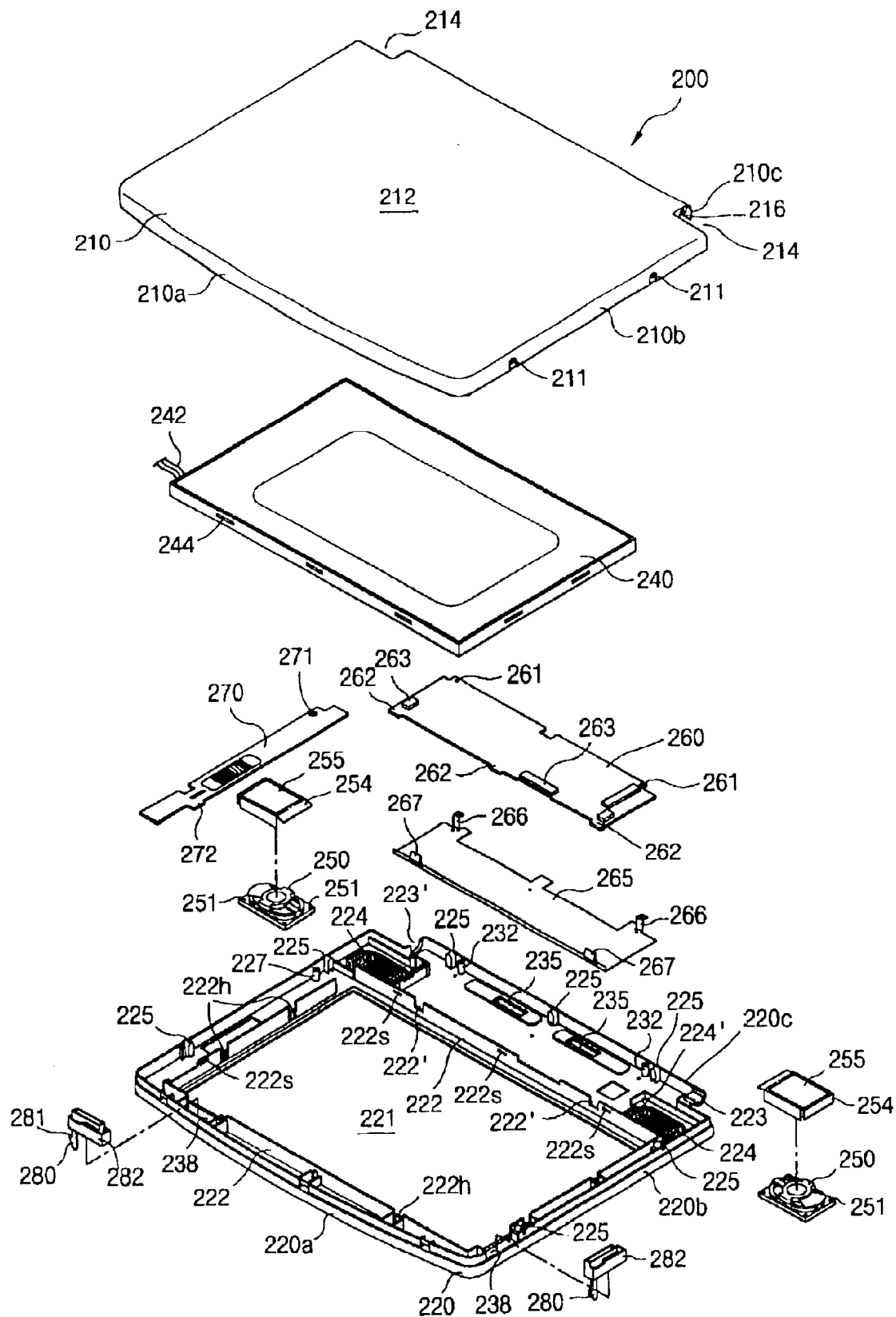
FIG. 4 is an exploded perspective view showing an internal construction of a display unit of the disk player of FIG. 1.

As shown in FIG. 4, the window fence 222 is formed at a position that retreats a bit from the marginal portion of the LCD window 221. The window fence 222 is not connected wholly as one body and is separated at some section.

A hooking hook 222h is formed at the portion formed as the window fence 22 is separated. The hooking hook 222h serves to hook and fix the LCD assembly 240. A connection slot 222' is formed at one side of the window fence 222, at which a connection piece 267 (to be described) is mounted. A plurality of board slots 222s are formed at the window fence 222 in order to fix the first and second LCD boards 260 and 270.

With reference to FIG. 4, a speaker grill 224 is formed at both sides of a lower end of the LCD window 221 of the front frame 220. The speaker grill 224 transmits a sound generated from a speaker 250 to the front side of the display unit 200. A guide pin 224' is formed at the peripheral corners of the speaker grill 224.

A cover engaging boss 226 is formed at the side wall 220b and the rear wall 220c of the front frame 220 in order to engage the cover 210 with the front frame 220. A screw is engaged penetrating the engage hole 221 of the cover 210 at the cover engaging boss 225.

A board boss 227 is formed at one side of the front frame 220. The board boss 227 is to engage a second LCD board (to be described).

A plurality of hinge bosses 230 are formed at a position adjacent to the hinge hole 223' in order to engage the hinge assembly 300. A second hinge plate 306 is engaged at the hinge boss 230.

A board boss 232 is formed at a lower end of the rear side of the front frame 220 in order to engage the first LCD board 260. A lever slot 235 is formed penetrating the lower end of the front frame 220, and a control lever 236 is installed at the lever slot 235.

With reference to FIGS. 4 and 5, two hook slots 238 are formed at the front side of the front frame 220. A locking hook 280 is protruded through the hook slot 238. The hook slot 238 is formed long with a certain length so that the locking hook 280 can be moved for a certain stroke.

The LCD assembly 240 is mounted on the LCD window 221. The marginal portion of the LCD assembly 240 is overlapped at the marginal portion of the LCD window 221, and the side of the LCD assembly 240 is supported by the window fence 222. The LCD assembly 240 is exposed to the front surface of the display unit 200 and displays an image recorded in the disk.

As shown in FIG. 4, the LCD assembly 240 includes a connection line 242 for connection with the second LCD board 270 and a plurality of hooking slots 244 into which the front end of the hooking hook 222h formed between the window fence is inserted are formed surrounding the side thereof.

Figure 18:
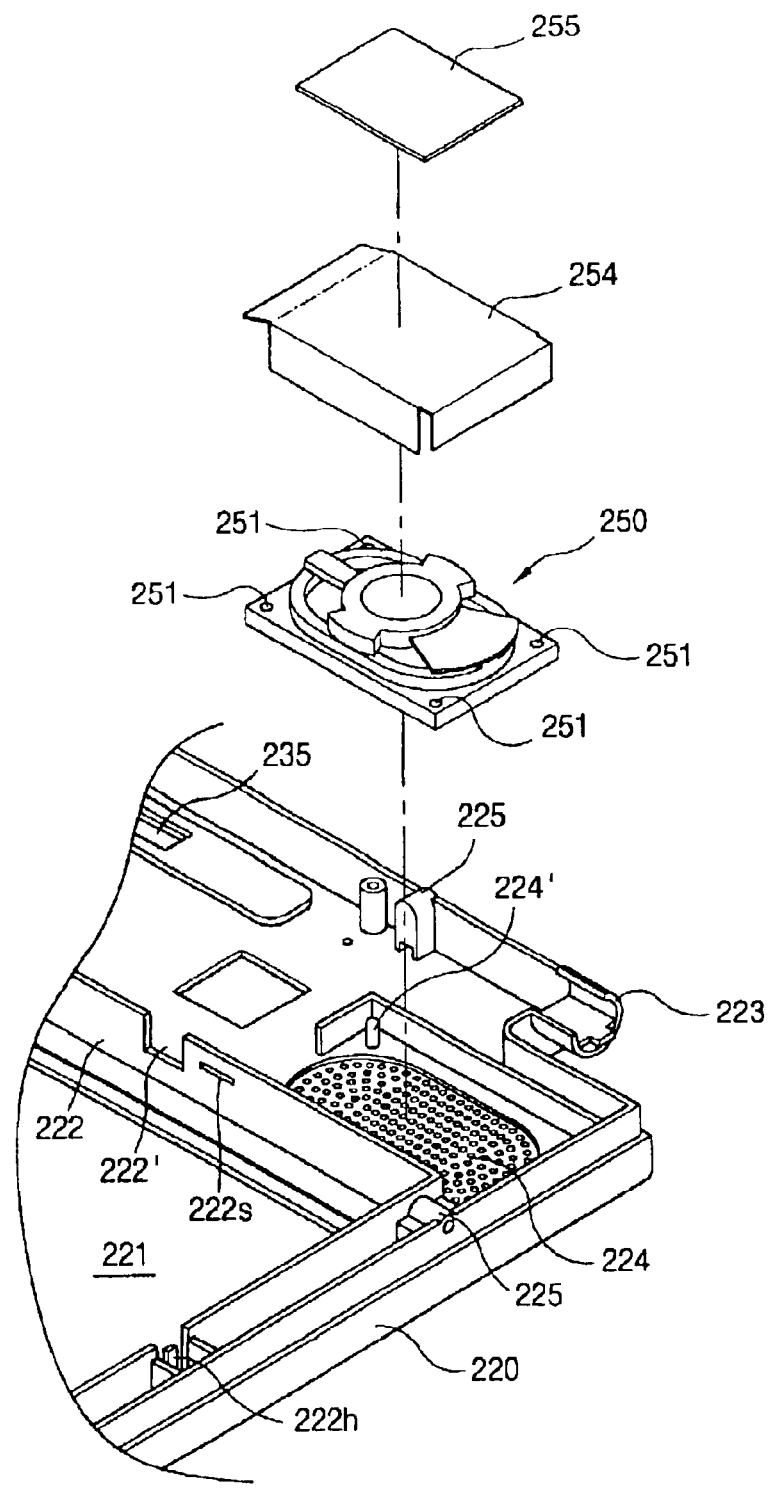
FIG. 18 is an exploded perspective view showing the construction that a speaker of the disk player of FIG. 1 is mounted.

Installation of the speaker 250 will now be described with reference to FIGS. 4 and 18.

The speaker 250 is installed at the rear side of the speaker grill 224. A guide hole 251 is formed at four corners of the speaker 250 and the guide pin 224' is inserted into the guide hole 251 to set the position of the speaker 250.

A sounding box 254 is installed to cover the speaker 250 mounted in the speaker grill 224. The sounding box 254 covers the speaker 250 so as to prevent a sound generated from the speaker 250 from dispersed backwardly of the speaker 250. A buffering pad 255 is attached at the upper surface of the sounding box 254. The buffering pad 255 is to fix the speaker 250 mounted in the speaker grill 224 of the front frame 220 by being tightly contacting with the cover 210 when the speaker 250 is engaged with the cover 210.

The buffering pad 255 is preferably made of a material that is able to work as a buffer, and a force depressed by the cover 210 is transferred to the sounding box 254 so that the sounding box 254 is depressed and fixed.

The first LCD board 260 is mounted at the lower end of the LCD window 221. The first LCD board 260 is engaged to the board boss 232. The first LCD board 260 transmits a signal transmitted from the main board 140, to the LCD assembly 240 and the speaker 250.

An engaging hole 261 is formed at a corresponding position at the first LCD board 260, for engagement with the board boss 232. A plurality of support hooking portions 262 inserted into the board slot 222s of the window fence 222 are formed.

Accordingly, the first LCD board 260 is fixed as the support hooking portions 262 are inserted into the board slot 222s and engaged with the board boss 232. A plurality of connectors 263 are installed at the first LCD board 260, for a signal transmission.

A ground plate 265 is mounted between the first LCD board 260 and the front frame 220. The ground plate 265 is a metal plate with a relatively large area, and a connection piece 267 is formed bent for grounding the LCD assembly 240 so as to be positioned in the connection slot 222' of the window fence 222. In order to engage the ground plate 265 at the same time when the LCD board 260 is engaged, an engaging piece 266 is formed at a position corresponding to the board boss 232.

The ground plate 265 serves as a ground shields to prevent an electronic wave coming from the first LCD board 260 from being transferred forwardly of the front frame 220.

The second LCD board 270 is installed at one side of the LCD window 221. The second LCD board 270 transmits a signal to the LCD assembly 240 and includes an engaging hole 271 formed for engagement with the engaging boss 227 and a support hooking portion 272 formed at one side thereof to be inserted into the board slot 222s of the window fence 222.

Various elements are mounted directing to the rear face of the support frame 220 at the upper surface of the second LCD board 270. This is to place a device or a part mounted on the second LCD board 270 between the upper surface of the board 270 and the rear face of the support frame 220, to thereby reduce the thickness of the display unit 200.

With reference to FIG. 1, the locking hook 280 is installed protruded to the front side of the front frame 220 through the hook slot 238 of the front frame 220.

Figure 19:
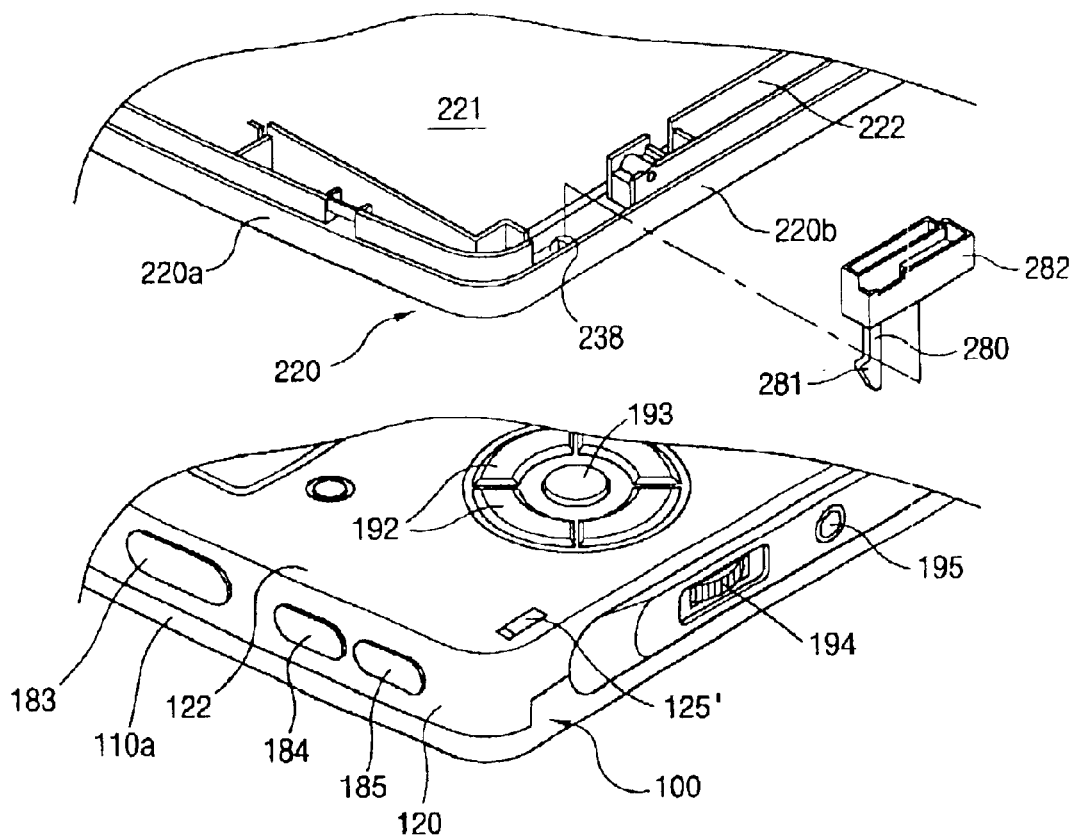
FIG. 19 is an exploded perspective showing a locking hook and its peripheral construction of the disk player of FIG. 1.
Figure 20:
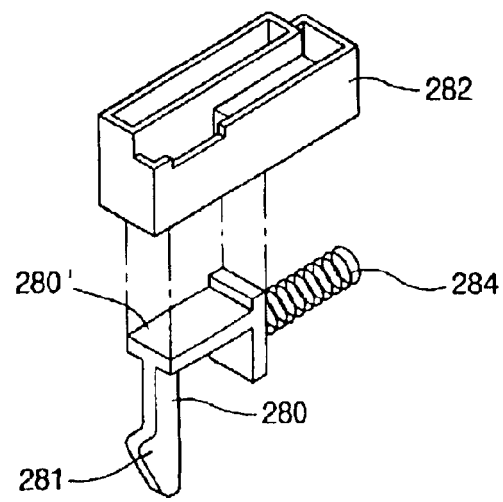
FIG. 20 is an exploded perspective view showing the construction of the locking hook of the disk player of FIG. 1.
Figure 21:
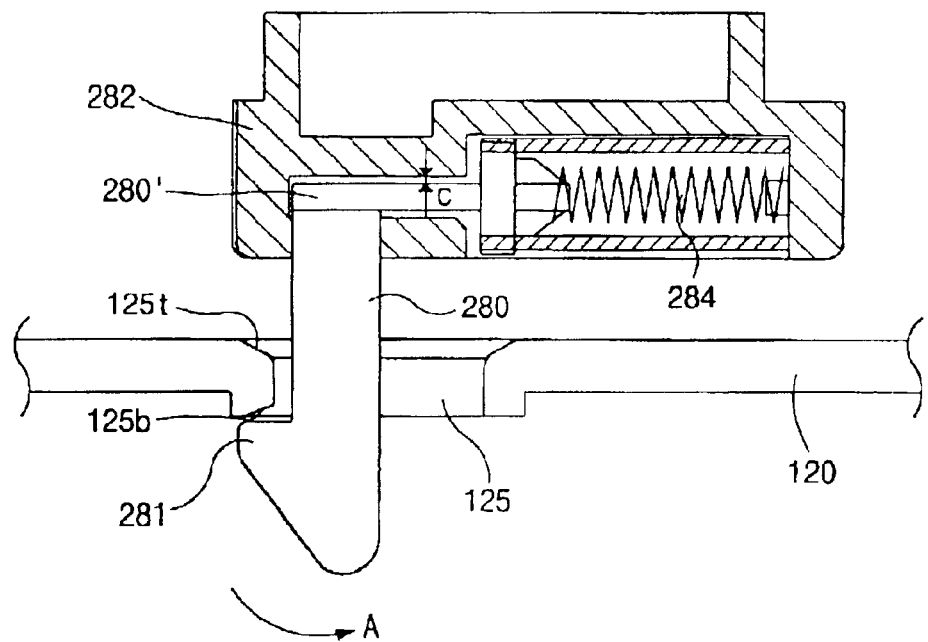
FIG. 21 is a sectional view showing an installation of the locking hook of the disk player of FIG. 1.
Figure 22:
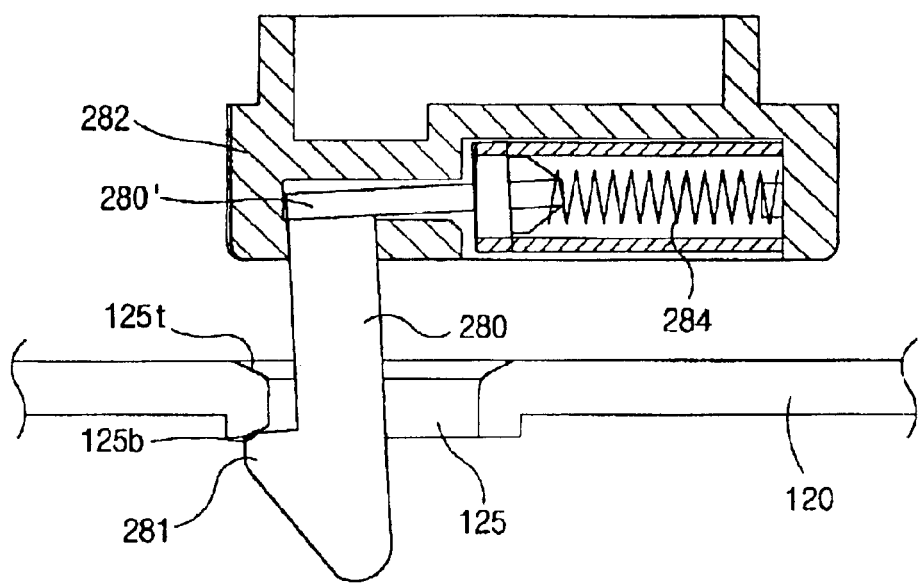
FIG. 22 is a view showing an operational state that the locking hook of the disk player of FIG. 1 is operated.

As shown in FIGS. 19 and 21, the locking hook 280 includes a hooking jaw 281 formed at a front end protruded through the hook slot 238. A hook body portion 280' of the locking hook 280 is installed inside a hook housing 282 installed at the inner side of the front frame 220. There is a recess C between the hook body portion 280' and the hook housing 282, so that when the display unit 200 is pulled down to open the display unit 200, the front end of the locking hook 280 is rotated in the direction of arrow 'A'. FIG. 22 illustrates the thusly rotated state.

The locking hook 280 is supported by the spring 284 inside the hook housing 282. The spring 284 exerts its elastic force in a direction that the hooking jaw 281 of the locking hook 280 is hooked at the hooking grooves 125 and 125'.

An upper inclined face 125t is formed exposed upwardly of the upper housing 120 at one side of the hooking grooves 125 and 125' of the upper housing 120. As shown in FIG. 21, the upper inclined face 125t is inclined downwardly toward the center of the hooking grooves 125 and 125'.

A lower inclined face 125b is formed at the inner side of the upper housing 120 where the upper inclined face 125t is formed. The lower inclined face 125b is formed as an upward inclination toward the center of the hooking grooves 125 and 125' on the basis of FIG. 21.

In this construction, when the display unit 200 is tightly attached to the base unit 100, the locking hook 280 is hooked at the hooking grooves 125 and 125' so that the display unit 200 may not be opened arbitrarily.

When the user applies a force to open the display unit 200, as shown in FIG. 22, the hooking jaw 281 of the locking hook 280 is somewhat rotated within the hooking grooves 125 and 125' and guided along the lower inclined face 125b. Then, the locking hook 280 is moved in a direction that it compresses the spring 284 within the hook housing 282, and the hooking jaw 281 is released from the hooking grooves 125 and 125', so that the engaged state is released.

When the display unit 200 is closed, the hooking jaw 281 of the locking hook 280 is guided along the upper inclined face 125t. In order to compress the spring 284 while being guided, the hook body portion 280' is moved inside the housing 282 and then moved to its original direction and hooked at the hooking grooves 125 and 125' when the locking hook 280 comes into the hooking grooves 125 and 125'. FIG. 21 illustrates this state.

Figure 23:
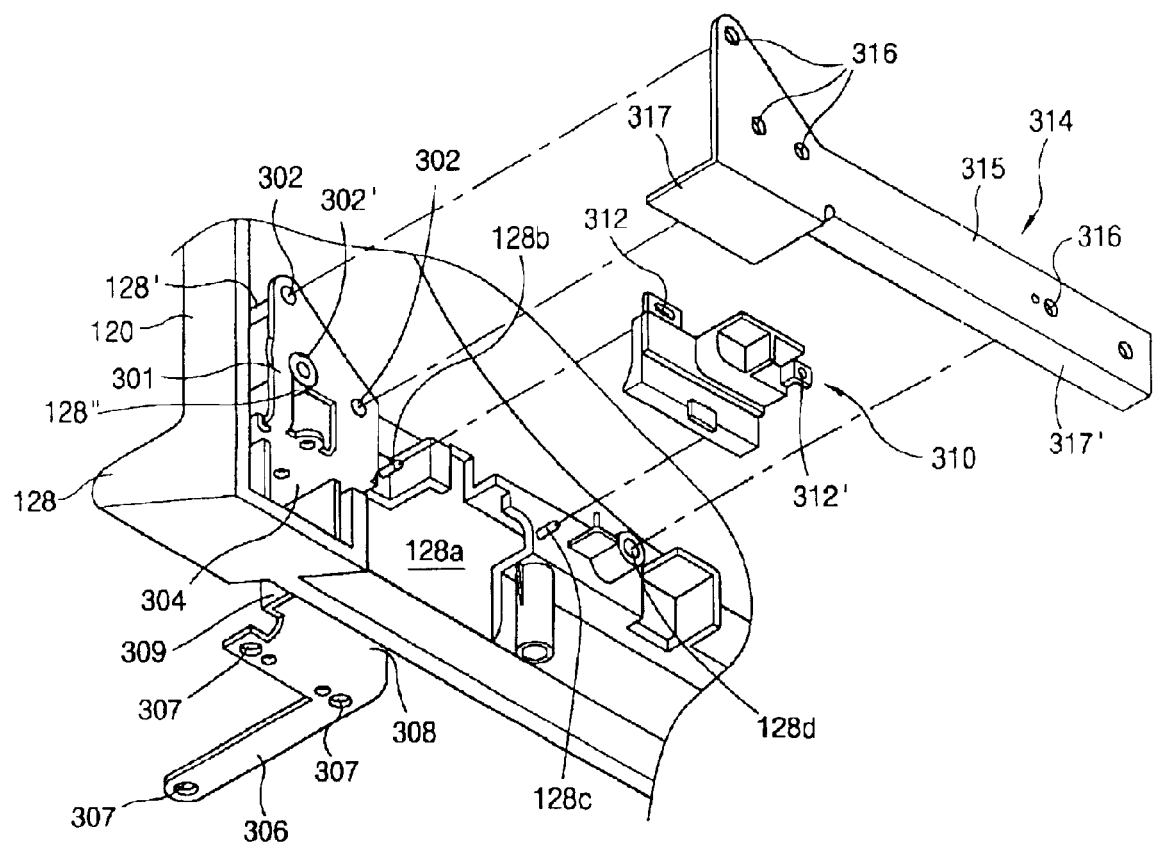
FIG. 23 is an exploded perspective view showing the construction of a hinge assembly of the disk player of FIG. 1.
Figure 24:
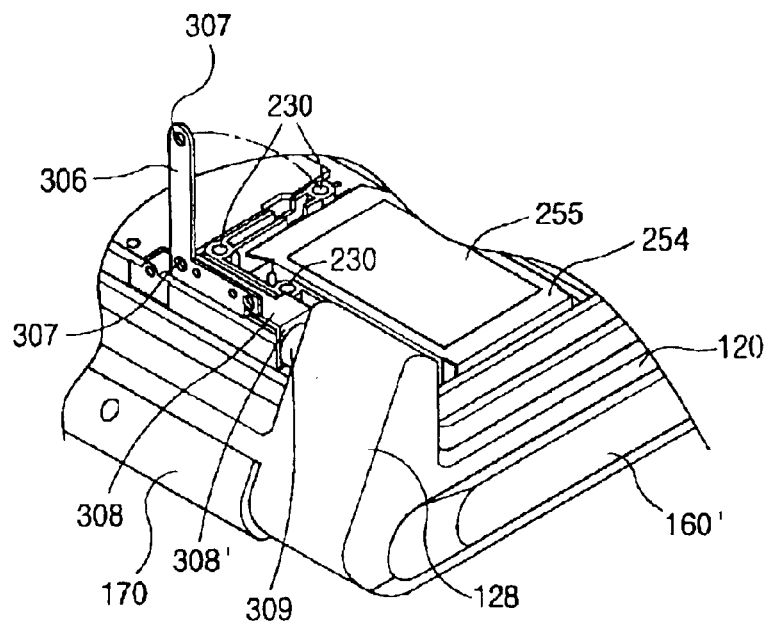
FIG. 24 is a perspective view showing the construction of the hinge assembly in a state that a cover of the disk player of FIG. 1 is removed.
Figure 25:
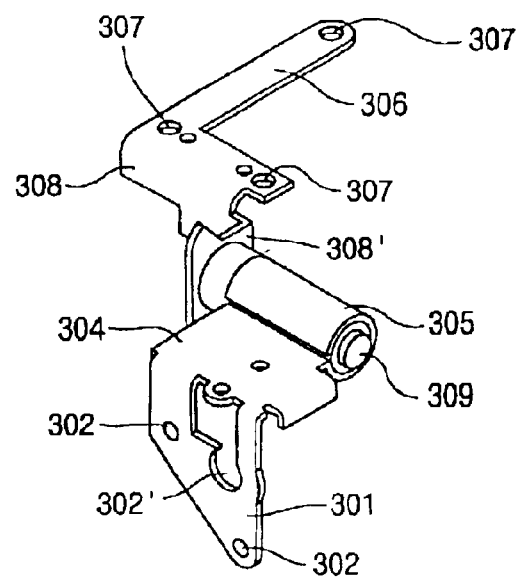
FIG. 25 is a perspective view showing the construction of a major part of the hinge assembly of the disk player of FIG. 1.

The construction of the hinge assembly 300 that connects the base unit 100 and the display unit 200 so that the display unit 200 is rotated at a certain angle will now be described with reference to FIGS. 23 and 25.

The hinge assembly 300 connects the base unit 100 and the display unit 200 by means of the first hinge plate 301 engaged at the upper housing 120 and the second hinge plate 306 engaged at the front frame 220.

Engaging holes 302 and 302' are formed at the first hinge plate 301, corresponding to the engaging bosses 128' and 128" of the upper housing 120. A screw is engaged at the engaging bosses 128' and 128" through the engaging holes 302 and 302'. The engaging boss 128" is mounted in the engaging hole 302' so that the front end of the engaging boss 128" is extended up to the height of the surface of the first hinge plate 301.

A first connection plate 304 is formed to be connected to the first hinge plate 301. The first connection plate 304 is formed bent by 90° against the first hinge plate 301. A hinge bushing is formed at the first connection plate 304.

An engaging hole 307 is formed at the second hinge plate 306, corresponding to the hinge boss 230 of the front frame 220. A screw is engaged at the hinge boss 230 through the engaging hole 307. A second connection plate 308 is formed connected to the second hinge plate 306. The second connection plate 308 is formed bent by 90° against the second hinge plate 306. A hinge shaft plate 308' is formed bent from the second connection plate 308, and a hinge shaft 309 inserted into the hinge bushing 305 and relatively rotated is formed perpendicularly at the hinge shaft plate 308'.

The hinge shaft 309 and the hinge bushing 305 are coupled so as to require a considerably great force for the rotation of the opposite party, for which the display unit 200 is set at an angle desired by the user.

The hinge shaft 309 and the hinge bushing 305 of the hinge assembly 300 are positioned inside the hinge protrusion portion 128, and as shown in FIG. 3, the second connection plate 308 and the second hinge plate 306 are protruded outwardly of the hinge protrusion portion 128 and engaged with the hinge boss 230 of the front frame 220.

At this time, the first hinge plate 301 and the second hinge plate 305 are respectively engaged at the upper housing 120 and the front plate 220 in a state that they are previously assembled. In this respect, for the convenience of the engagement, a space 310 is installed at the upper housing 120.

The spacer 310 is mounted in an assembly space 128a formed at the upper housing 120 and insertedly fixed at mounting protrusions 128b and 128c formed adjacent to the assembly space 128a.

The spacer 310 is formed in a shape corresponding to the assembly space 128a and formed at a position that the insertion holes 312 and 312' into which the mounting protrusions 128b and 128c are inserted corresponds.

The support plate 314 is engaged at the first hinge plate 301 and the engaging boss 128'. The support plate 314 includes an engaging piece 315 formed long with a plurality of engaging holes 316 formed thereon, and skirts 317 and 317' are formed at one side of the engaging piece 315. The engaging hole 316 formed at the engaging piece 315, positioned corresponding to the skirt 317', is for engagement with the engaging boss 128d. The skirts 317 and 317' are formed bent perpendicular to the engaging piece 315 and in contact with one side of the lower surface of the upper housing 120 where the support plate 314 is mounted.

The operation of the portable disk reproducing apparatus constructed as described above will now be explained.

First, the display unit 200 is used in a state of being opened at a certain angle by the hinge assembly 300 for the base unit 100. At this time, as for the hinge assembly 300, the hinge shaft 309 is rotatably press-fit to the hinge bushing 305 so as to support the load of the display unit 200.

With reference to FIG. 1, in general, in a use state, the display unit 200 is separated from the base unit 100 and unfolded. When not being used, as shown in FIG. 2, the display unit 200 is tightly closed to the upper surface of the base unit 100.

At this time, the display unit 200 is maintained in the engaged state as the locking hook 280 is hooked at the hooking grooves 125 and 125' of the base unit 100. Here, the hooking jaw 281 of the locking hook 280 is hooked at the inner side of the hooking grooves 125 and 125' by the elastic force of the spring 284.

In this state, when the user intends to separates the display unit 200 from the base unit 100 by lifting up the front end of the display unit 200, the locking hook 280 is rotated in the direction of arrow 'A' of FIG. 21 by the hooking jaw 281 hooked at the inner side of the hooking grooves 125 and 125' and the hooking jaw 281 starts to be guided to the lower inclined face 125b. The fact that the locking hook 280 is rotated in the direction of arrow 'A' is because the hook body portion 280 is installed with a recess (c) with the inside of the hooking housing 282.

In this state, when the user keeps applying a force in a direction that the display unit 200 is opened, the hooking jaw 281 is guided along the lower inclined face 125b and the locking hook 280 is released from the hooking grooves 125 and 125'.

At this time, the hook body portion 280' of the locking hook 280 is moved in a direction that it compresses the spring 284 inside the hook housing 282. Thus, the locking hook 280 is moved in a direction of the end portion of one side of the hook slot 238 of the front frame 220.

When the locking hook 280 is completely released from the hooking grooves 125 and 125', the spring 284 is restored and the locking hook 280 is moved in a direction of the end portion of the other side from the hook slot 238.

Thus, the user can directly open the display unit 200 without an operation for releasing the engaging state of the locking hook 280. That is, the user can open the display unit 200 by one-time operation.

The speaker 250 is mounted at the rear side of the front frame 220 without using a screw, but it can transmit a generated sound to the user in front of the display unit 200 accurately.

That is, an installation position of the speaker 250 is determined by the guide pin 224' formed at the rear side of the speaker grill 224 formed exposed forwardly of the front frame 220.

And the speaker 250 is fixed by the sounding box 254 pressing the speaker 250 from the rear side of the speaker 250.

At this time, the sounding box 254 is fixed by being pressed as the cover 210 is mounted at the front frame 220. In order to ensure the fixing of the sounding box 254, the buffering pad 255 is provided between the sounding box 254 and the cover 210.

The sounding box 254 serves to ensure the fixing of the speaker 250 and clearly transmit a sound coming from the speaker 250 forwardly through the speaker grill 224. The buffering pad 255 also serves to absorb a vibration and a noise that may be generated from the speaker 250 and transferred to the sounding box 254, and more accurately transfers only the sound generated from the speaker 250.

In this construction, since the position of the speaker 250 is set by the guide pin 224' and the speaker 250 is fixed by pressing with the sounding box 254 without using a screw to fix it, a space can be relatively saved for construction required for fixing the speaker 250, so that it is favorable to obtain a thin and small display unit 200.

The first and second LCD boards 260 and 270 are mounted with a simple construction at the rear side of the front frame 220.

That is, the first LCD board 260 is mounted as the screw is engaged with the board boss 232 through the engaging hole 261 in a state that the support hooking portion 262 is inserted into the board slot 222s of the window fence 222.

Thus, since the support hooking portion 252 is inserted into the board slot 222s of the window fence 222 to fix one side of the first LCD board 260, an additional construction does not need for fixing, and thus, the display unit 20 can be light, thin and compact.

In addition, since the number of the parts used for mounting of the first LCD board 260 is minimized, a production unit cost can be reduced and a workability of the assembly operation can be heightened.

The ground plate 265 is positioned between the first LCD board 260 and the front frame 220. That is, the engaging piece 266 corresponding to the board boss 232 is positioned between the LCD board 260 and the board boss 232 and engaged as the first LCD board 260 is engaged.

The connection pin 267 is connected to the LCD assembly 240 through the connection slot 222'.

In this construction, grounding is made by the ground plate 265 and an electronic wave generated from the first LCD board 260 is cut off from being transferred forwardly of the front frame 220. Thus, it is not necessary to add a grounding structure or an electronic wave shielding structure, and thus, the number of the entire parts can be reduced.

Mounting of the second LCD board 270 is similar to that of the first LCD board 260.

That is, the support hooking portion 272 formed at one side of the second LCD board 270 is inserted into the board slot 222s formed at the window fence 222, and the screw is engaged with the board boss 227 at one side of the front frame 220 through the engaging hole 271, thereby mounting the second LCD board 270.

Also, in this case, since the second LCD board 270 is mounted by a simple construction, a mounting workability is improved, and since it is not necessary to provide a construction for engagement, the display unit 200 can be light, thin and compact.

The pick-up base having constructions for reading a signal recorded in the disk is fixed as the combination pin 127 formed at the lower surface of the upper housing 120 is inserted into the guide shaft 119 of the lower housing 110 and the vibration damper 156 installed at the plurality of vibration damper receiving portions 154 is inserted into the guide shaft 119.

That is, the lower surface of the vibration damper 156 is supported by the vibration damper support 119t formed at the lower end of the guide shaft 118, and the upper surface of the vibration damper 156 is supported by the inside of the mounting guide 127', that is, the lower surface of the upper housing 120, to thereby support the pick-up base 150.

In this construction, vertical movement and eccentricity of the pick-up base 150 is prevented by the combination between the guide shaft 119 and the combination pin 127, and a vibration and a noise transferred between the pick-up base 150 and the base unit 100 are absorbed by the vibration damper 156.

Thus, without using a screw, the pick-up base is engaged as the upper housing 120 and the lower housing 110 are mutually engaged.

In this construction, since no construction is necessary for fixing the pick-up base 150, the entire parts can be reduced in number, and especially, since the height of the base unit 100 can be minimized, the base unit 100 can be slim.

The display LCD 149 is mounted on the button board 148. A signal connection with other elements of the button board 148 or a circuit pattern is made by the connection terminal 149t. The board connection unit 149p connected with the button board 148 is formed in parallel with the upper surface of the button board 148.

Thus, the connection terminal 149t is mounted as the board connection unit 149p is directly soldered to the surface of the button board 148.

Thus, since the connection terminal 149t is directly soldered to the upper surface of the button board 148 without forming a mounting hole, it is not necessary to form a mounting hole at the button board 148.

Thus, the mounting space of the button board 148 can be more effectively used. In addition, since no mounting hole is formed, a lower surface of the button board 148 using both sides thereof can be effectively used.

Moreover, since the board connection unit 149p of the connection terminal 149t is formed in parallel to the surface of the board 148, the display LCD 149 can be mounted at the button board 148 in an automated process without such a process for inserting the connection terminal into a mounting hole as in the conventional art. Thus, its workability can be heightened.

In addition, no mounting hole is formed to connect the connection terminal 149t to the button board 148, occurrence of interference with the main board 140 installed at the lower side of the button board 148 or influence to each other can be minimized. Thus, the space between the main board 140 and the button board 148 can be maintained at the minimum, so that an operation stability of the disk player can be obtained in the thin construction.

The converting lever 197 is installed to be exposed through the first deco panel 160. At this time, a guide protrusion 199t of the shift guide 198 and the drive lever 199 is formed at the rear side of the converting lever 197, so that the converting lever 197 can be freely moved along the through hole 165 of the first deco panel 160.

Thus, since the construction for guiding the movement of the converting lever 197 is formed at the converting lever 197 itself, rather than being formed at the lower housing 110 or the upper housing 120, and the converting lever 197 is inserted into the through hole 165 formed at the first deco panel 160 and movable, the side of the base unit 100 can be formed more variably.

Namely, by mounting the first deco panel 160 at the panel mounting portions 111 and 121 of the base unit 100 and installing the converting lever 197 to be movable at the first deco panel 160, the first deco panel 160 can be formed by a material and color different from the upper housing 120 and the lower housing 110. Thus, the base unit 100 can have a fine appearance while the function of the converting lever 197 can be sufficiently obtained.

No part is used to fix with respect to installation of the LED holder 181 in the present invention. The LED holder 181 is fixed by being inserted into the through hole 120 of the fixing pin 120p and the front wall 120a formed at the lower surface of the upper housing 120. The fixing pin 120p is inserted into the fixing pin hole 181h at the rear end of the LED holder 181 and a power display lamp 181' formed protruded at the front end of the LED holder 181 is inserted into the through hole 120h.

In this respect, in order to render the LED holder 181 to be more tightly inserted between the fixing pin 120p and the through hole 120h, the elastic slot 181e is formed at both ends of the fixing pin hole 181h.

The elastic slot 181e allows the fixing pin 120p to be more easily inserted into the fixing pin hole 181h. A support leg 181f of the LED holder 181 is supported on the power board 145 so that the LED holder 181 can be fixed without movement.

The LED holder 181 includes a light reflecting portion 181r so that a light coming from the LED 145r installed at the upper surface of the power board 145 can be effectively transferred to the power display lamp 181 installed at a position perpendicular to the light emitting direction of the LED 145r.

As so far described, the portable disk player of the present invention has many advantages.

That is, for example, first, the display unit is more accurately and surely attached and closed to the base unit and it is easy to separate the display unit from the base unit.

Secondly, the speaker can be firmly fixed by assembly the cover in a state that the sounding box and the buffering pad are inserted, without a fixing structure, and a sound can be clearly transferred forwardly by the sounding box.

Thirdly, since the board is mounted by using neighboring structure without having a particular construction, the board can be engaged with the relatively small number of parts. Thus, the parts can be reduced in number, a workability of the assembly operation can be improved, and the entire device can be light, thin and compact.

Fourthly, the installation position of the pick-up base where the pick-up is installed is set by combination between the guide shaft and the combination pin formed at the upper housing and the lower housing constituting the base unit and supported by the vibration damper of which upper and lower ends are supported by the upper housing and the lower housing to absorb a vibration and a noise. Thus, the thickness of the base unit can be minimized. Thus, it is not necessary to use an engaging unit to fix the pick-up base.

Fifthly, in order to avoid an interference between the board installed adjacent to the base unit and effectively use the both sides of the board, the connection terminal for a signal connection between the display LCD and the board is directly soldered to the surface of the board. Thus, the both sides of the board can be effectively used, and an interference with an adjacent board can be avoided, so that the base unit can be light, thin and compact.

Sixthly, various terminals, a dial and a converting lever are installed exposed at the deco panel forming the side of the base unit, and especially, the converting lever is installed to be movable at the deco panel itself. Thus, the design of the deco panel can be freely changed to vary the outer appearance of the base unit.

Lastly, the LED holder is engaged without using an engaging unit, and a transfer path of the LED light is bent by 90°, so that the base unit can be slim.

Consequently, the base unit and the display unit can be light, thin and compact, so that the portability of a disk player can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A disk player comprising:
    a base unit, to which a display unit is rotatably connected, having an upper housing and a lower housing;
    a board installed between the upper housing and the lower housing;
    a display LCD installed on an upper surface of the board for displaying an operational state through the upper housing;
    a board connection unit installed on and connected to the board, and electrically connected at one side to the display LCD and at another side to said board, for transferring a signal to the display LCD; and
    an LCD case installed on the board for receiving the display LCD,
    wherein the LCD case includes a plurality of engaging hooks for being fixed to the board.

2. The disk player of claim 1, wherein the board connection unit is in parallel with the board.

3. The disk player of claim 1, further comprising a main board installed between the lower housing and the board.

4. The disk player of claim 3, wherein the board is electrically connected with the main board by a connecter, and the connecter supports the board.

5. The disk player of claim 1, wherein the board connection unit is connected by soldering.

6. The disk player of claim 1, wherein both upper and lower surfaces of the board connection unit are formed with circuits.

7. The disk player of claim 6, wherein a plurality of buttons are installed on the board.

8. A disk apparatus comprising:
    a base unit, to which a display unit is rotatably connected, having an upper housing and a lower housing;
    a board installed between the upper housing and the lower housing;
    a display LCD installed on an upper surface of the board for displaying an operational state through the upper housing;
    a board connection unit installed on and connected to the board, and electrically connected at one side to the display LCD and at another side to said board, for transferring a signal to the display LCD; and
    a fixing unit comprising a combination pin formed protruded from the lower housing, and a guide shaft formed protruded from the upper housing and penetrating the center of a vibration damper, and having a combination hole into which the combination pin is inserted.

9. The disk apparatus of claim 8, wherein the board connection unit is in parallel with the board.

10. The disk apparatus of claim 8, further comprising a main board installed between the lower housing and the board.

11. The disk apparatus of claim 8, wherein the board is electrically connected with a main board by a connector, and the connector supports the board.

* * * * *